(12) United States Patent
Osada et al.

(10) Patent No.: US 8,344,888 B2
(45) Date of Patent: Jan. 1, 2013

(54) SEMICONDUCTOR DEVICE

(75) Inventors: Takeshi Osada, Isehara (JP); Hikaru Tamura, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1333 days.

(21) Appl. No.: 11/892,568

(22) Filed: Aug. 24, 2007

(65) Prior Publication Data

US 2008/0055047 A1 Mar. 6, 2008

(30) Foreign Application Priority Data

Aug. 31, 2006 (JP) ................................. 2006-236928

(51) Int. Cl.
*G08B 13/14* (2006.01)

(52) U.S. Cl. ................. 340/572.7; 340/10.1; 340/12.51; 340/13.26

(58) Field of Classification Search ............... 340/572.7, 340/572.4, 10.34, 10.33, 572.1
See application file for complete search history.

(56) References Cited

U.S. PATENT DOCUMENTS

| | | | | |
|---|---|---|---|---|
| 5,214,364 A * | 5/1993 | Perdue et al. | ................... | 318/600 |
| 5,771,002 A * | 6/1998 | Creek et al. | ............... | 340/539.21 |
| 5,867,796 A * | 2/1999 | Inutsuka | ........................ | 455/567 |
| 6,078,791 A * | 6/2000 | Tuttle et al. | ................... | 455/90.1 |
| 6,208,636 B1 * | 3/2001 | Tawil et al. | .................... | 370/351 |
| 6,223,990 B1 | 5/2001 | Kamei | | |
| 6,366,260 B1 * | 4/2002 | Carrender | ....................... | 343/866 |
| 6,441,778 B1 * | 8/2002 | Durst et al. | ............... | 342/357.55 |
| 6,480,147 B2 * | 11/2002 | Durst et al. | ............... | 342/357.55 |
| 6,509,217 B1 | 1/2003 | Reddy | | |
| 6,556,630 B1 * | 4/2003 | Brinsfield et al. | ............. | 375/335 |
| 6,615,074 B2 * | 9/2003 | Mickle et al. | .................. | 600/509 |
| 6,737,302 B2 | 5/2004 | Arao | | |
| 6,844,859 B2 * | 1/2005 | Noda et al. | ..................... | 343/744 |
| 6,894,616 B1 * | 5/2005 | Forster | ....................... | 340/572.1 |
| 6,946,958 B2 | 9/2005 | Gundlach et al. | | |
| 6,977,551 B2 * | 12/2005 | Ichitsubo et al. | .............. | 330/279 |
| 6,990,317 B2 * | 1/2006 | Arnold | ............................ | 455/59 |
| 7,057,562 B2 * | 6/2006 | Forster et al. | .......... | 343/700 MS |
| 7,106,246 B1 * | 9/2006 | Lindell | ............................ | 342/51 |
| 7,202,790 B2 * | 4/2007 | Copeland et al. | .......... | 340/572.7 |
| 7,347,379 B2 * | 3/2008 | Ward et al. | ..................... | 235/492 |
| 7,353,089 B1 * | 4/2008 | McEvoy | ............................ | 701/2 |
| 7,375,637 B2 * | 5/2008 | Mickle et al. | .............. | 340/572.1 |

(Continued)

FOREIGN PATENT DOCUMENTS

JP 09-001968 1/1997

(Continued)

*Primary Examiner* — Daniel Wu
*Assistant Examiner* — Rufus Point
(74) *Attorney, Agent, or Firm* — Eric J. Robinson; Robinson Intellectual Property Law Office, P.C.

(57) ABSTRACT

The semiconductor device includes a signal processing circuit, an antenna circuit that is connected to the signal processing circuit, and a storage means that supplies electric power to the signal processing circuit. The signal processing circuit receives and transmits information through the antenna circuit, generates a direct current voltage from signals received by the antenna circuit, and stores the direct current voltage in the storage means. Furthermore, the antenna circuit has an antenna portion that receives signals by an electromagnetic induction method and an antenna portion that receives signals by a microwave method so that signals of frequencies from a wide band can be received. Because signals from a wide band can be received, the environment in which the storage means can be charged is widened.

9 Claims, 16 Drawing Sheets

U.S. PATENT DOCUMENTS

| | | |
|---|---|---|
| 7,538,679 B2 * | 5/2009 | Shanks ................... 340/572.1 |
| 7,545,276 B2 * | 6/2009 | Shionoiri et al. .......... 340/572.1 |
| 7,576,657 B2 * | 8/2009 | Duron et al. ............... 340/572.7 |
| 2002/0049714 A1 | 4/2002 | Yamazaki et al. |
| 2004/0128246 A1 | 7/2004 | Takayama et al. |
| 2004/0145454 A1 | 7/2004 | Powell et al. |
| 2004/0227682 A1 * | 11/2004 | Anderson .................... 343/742 |
| 2005/0087599 A1 * | 4/2005 | Ward et al. ................... 235/451 |
| 2005/0215119 A1 | 9/2005 | Kaneko |
| 2005/0254183 A1 | 11/2005 | Ishida et al. |
| 2006/0009251 A1 | 1/2006 | Noda et al. |
| 2006/0103535 A1 * | 5/2006 | Pahlaven et al. ........... 340/572.1 |
| 2006/0197668 A1 * | 9/2006 | Oliver et al. ............... 340/572.4 |
| 2007/0046468 A1 * | 3/2007 | Davis ........................ 340/572.1 |
| 2007/0120678 A1 * | 5/2007 | Posamentier ............... 340/572.7 |

FOREIGN PATENT DOCUMENTS

| | | |
|---|---|---|
| JP | 10-307898 | 11/1998 |
| JP | 2003-006592 | 1/2003 |
| JP | 2003-070187 | 3/2003 |
| JP | 2003-299255 | 10/2003 |
| JP | 2004-513464 | 4/2004 |
| JP | 2004-343410 | 12/2004 |
| JP | 2005-191705 A | 7/2005 |
| JP | 2005-192050 A | 7/2005 |
| JP | 2005-252853 | 9/2005 |
| JP | 2005-316724 | 11/2005 |
| JP | 2005-352434 | 12/2005 |
| JP | 2005-354888 | 12/2005 |
| JP | 2006-024087 | 1/2006 |
| JP | 2006-503376 | 1/2006 |
| JP | 2006-127363 A | 5/2006 |
| JP | 2006-185050 A | 7/2006 |
| WO | WO-97/00493 | 1/1997 |

* cited by examiner

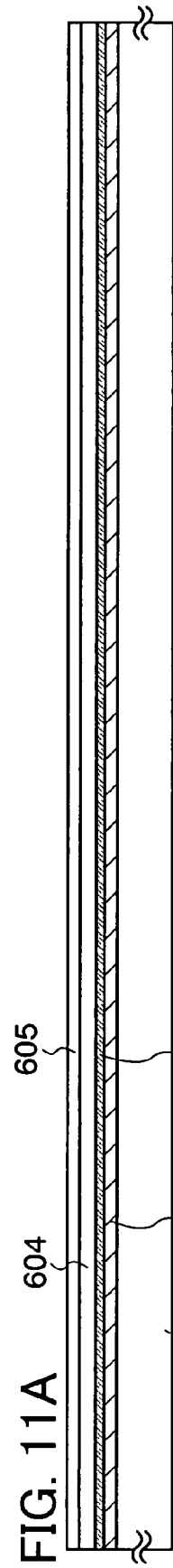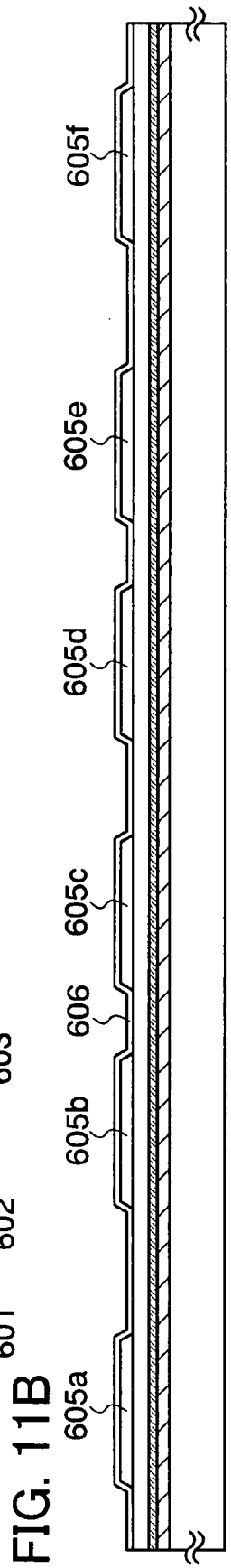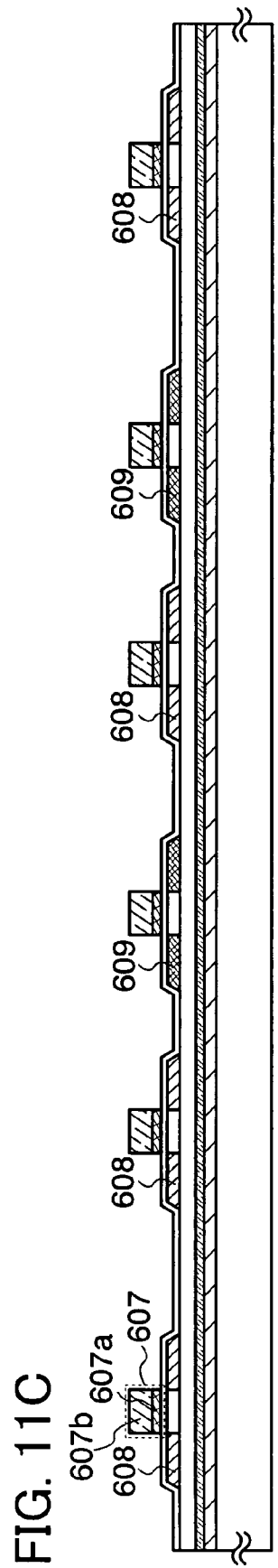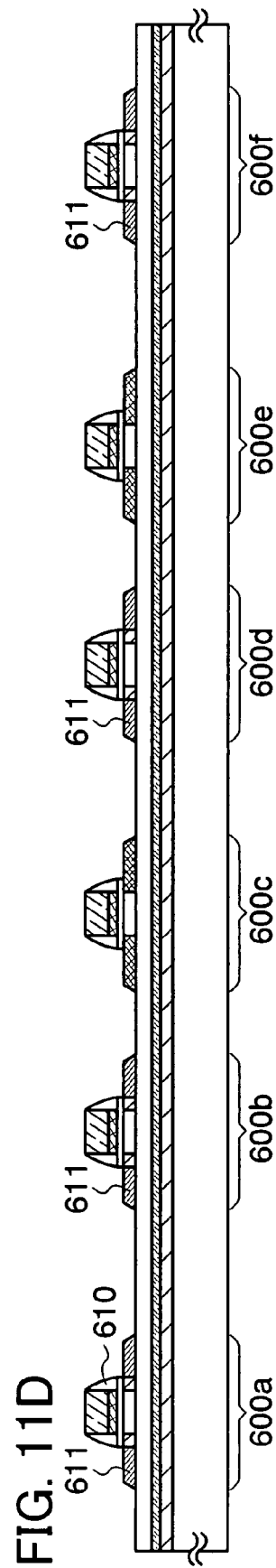

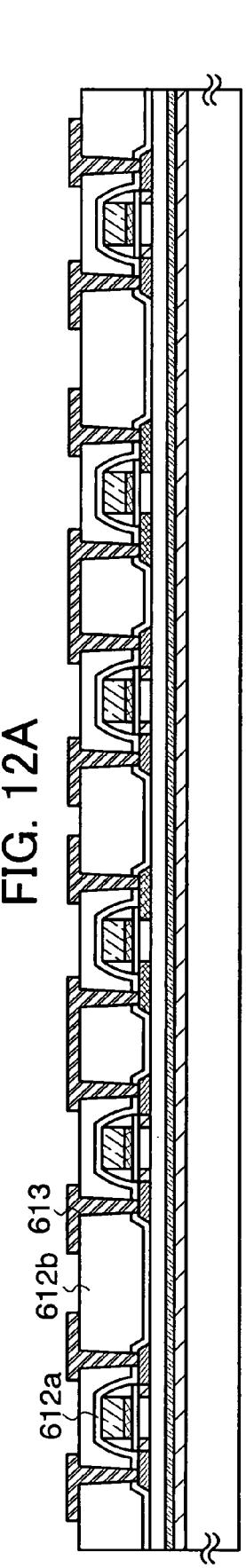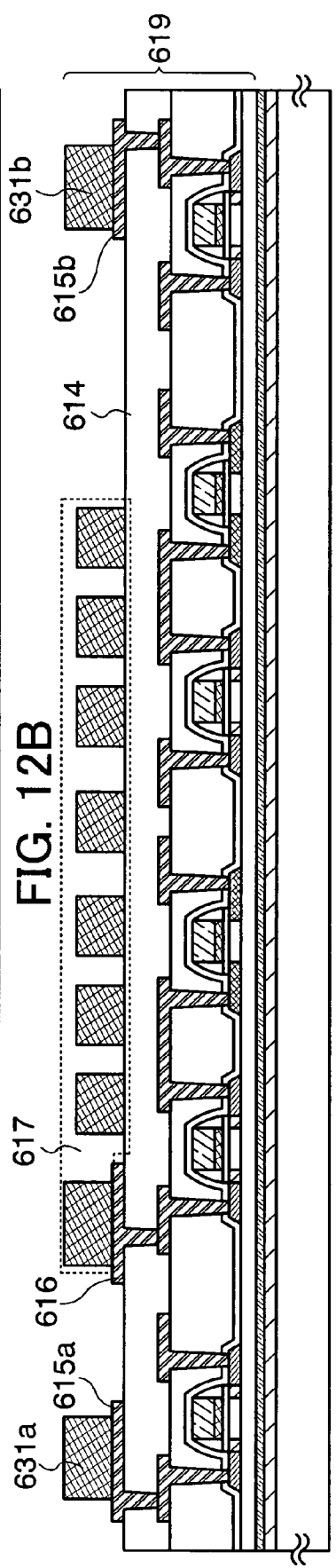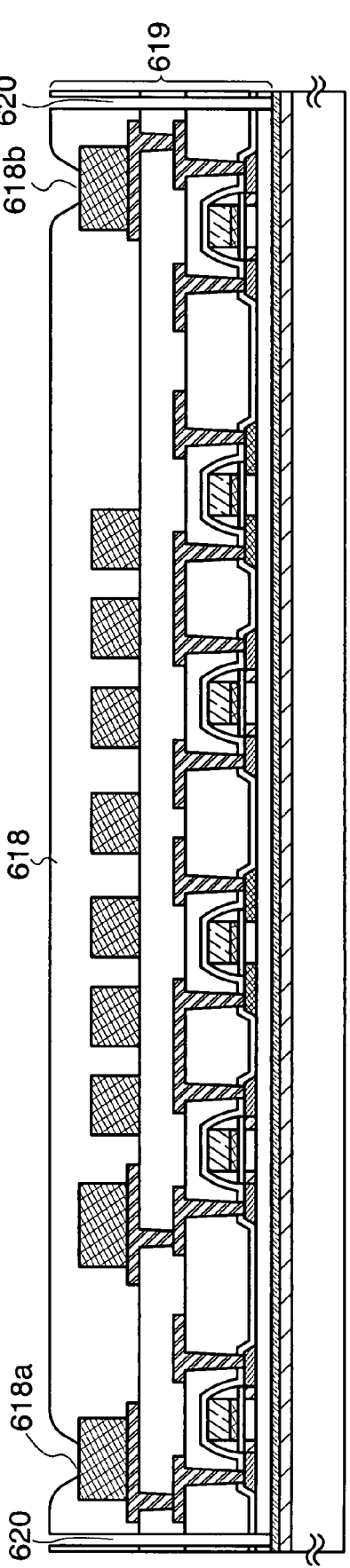

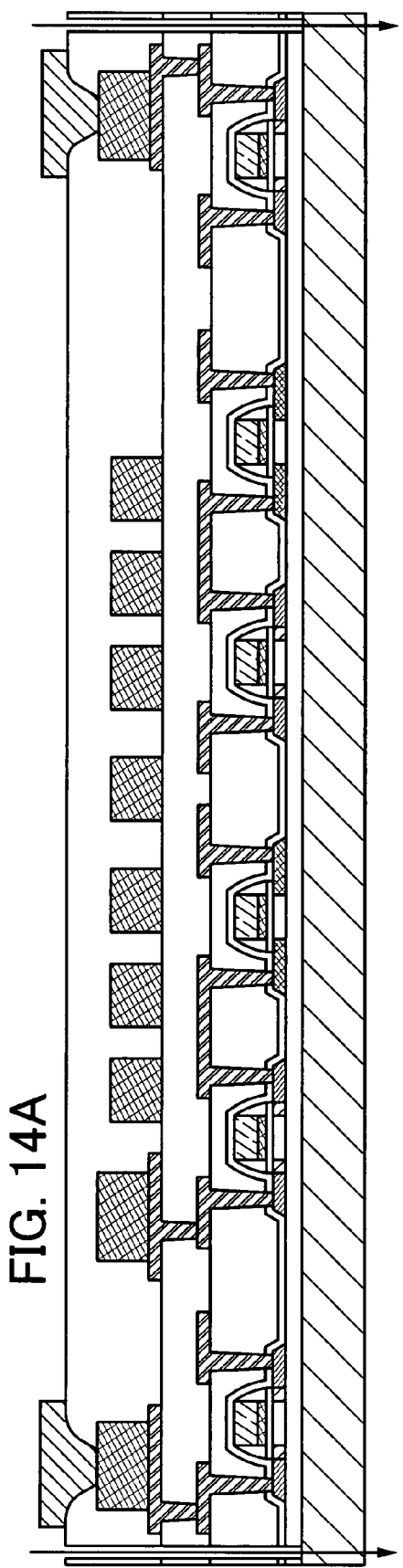
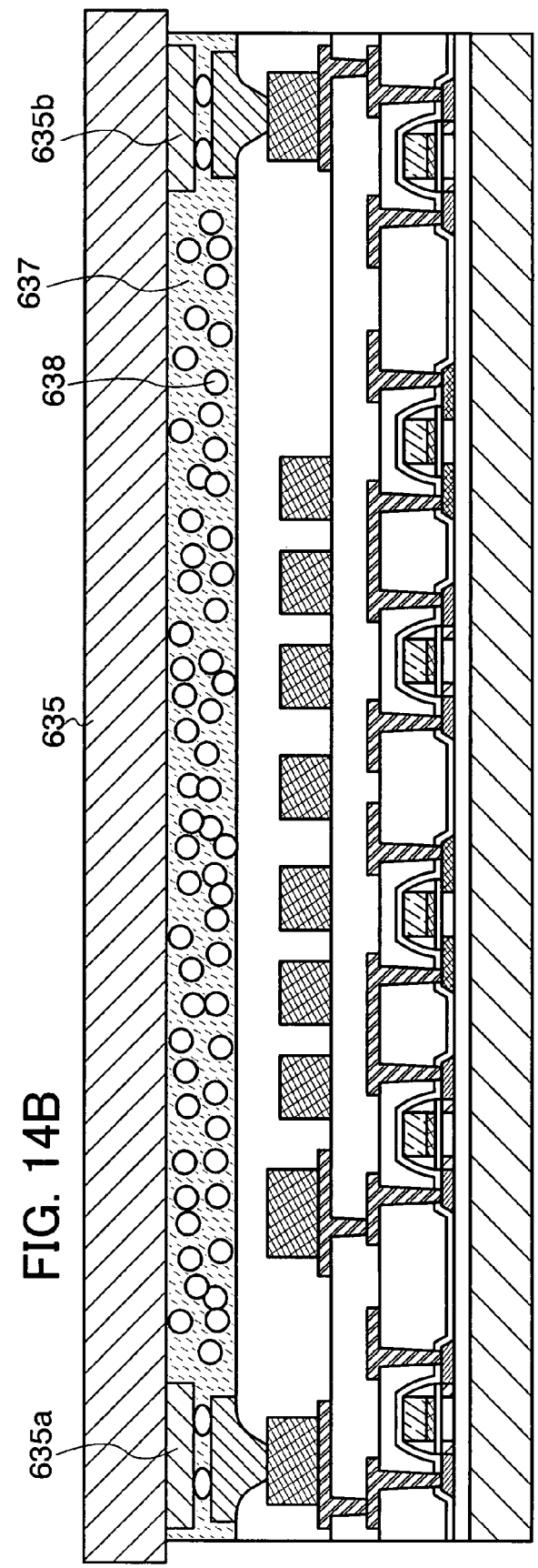

SEMICONDUCTOR DEVICE

BACKGROUND OF THE INVENTION

1. Field of the Invention

The present invention relates to a semiconductor device by which communication of data is performed wirelessly.

2. Description of the Related Art

In recent years, individual identification technology using wireless communication has been gathering attention. In particular, individual identification technology using RFID (radio frequency identification) tags as semiconductor devices by which exchange of data is performed by wireless communication has been gathering attention. RFID tags (hereinafter, simply called RFID) are also referred to as IC (integrated circuit) tags, IC chips, RF tags, wireless tags, and electronic tags. Individual identification technology using RFID has begun to be used in the production and management of individual objects, the identification of individual people, and the like.

RFID can be divided into two types, active RFID in which electromagnetic waves that include RFID information can be received and passive RFID that is driven using electric power of electromagnetic waves from an external source, depending on whether a power supply is built-in or whether a supply of power is received from an external source. In Patent Document Reference 1: Japanese Published Patent Application No. 2005-316724, there is a description related to active RFID. Furthermore, in Patent Document Reference 2: Japanese Translation of PCT International Application No. 2006-503376, there is a description related to passive RFID. Active RFID has a built-in power supply used for driving the RFID. Passive RFID has no built-in battery but power is generated using electric power of received electromagnetic waves.

In FIG. 21, a block diagram of a specific structure of active RFID is shown. In active RFID 300 in FIG. 21, communicated signals received by an antenna circuit 301 are input into a signal processing circuit 302. Commonly, processing of ASK modulation, PSK modulation, or the like is performed on a carrier wave of 13.56 MHz, 915 MHz, or the like, and the communicated signals are transmitted. In FIG. 21, an example of a structure of active RFID where the frequency of the communicated signals is 13.56 MHz is shown.

In the RFID 300, a standard clock signal for processing signals is needed, and, here, a carrier wave of 13.56 MHz is used as the clock. An amplifier 307 amplifies the 13.56 MHz carrier wave and supplies the 13.56 MHz carrier wave to a logic circuit 308 as a clock. In addition, a communicated signal modulated by ASK modulation or PSK modulation is demodulated by a demodulation circuit 306. After being demodulated, the signal is also transmitted to the logic circuit 308 and analyzed. The signal analyzed by the logic circuit 308 is transmitted to a memory controller circuit 309. Based on this signal, the memory controller circuit 309 controls a memory circuit 310, and data stored in the memory circuit 310 is retrieved and transmitted to a logic circuit 305. After the data is encoded by the logic circuit 305, the signal is amplified by an amplifier 304, and by this signal, modulation is applied to the signal by a modulating circuit 303. Here, in FIG. 21, power is supplied by a battery 261 through a power supply circuit 260. The power supply circuit 260 supplies electric power to the amplifier 307, the demodulation circuit 306, the logic circuit 308, the memory controller circuit 309, the memory circuit 310, the logic circuit 305, the amplifier 304, the modulation circuit 303, and the like. Active RFID operates in this way.

In FIG. 20, a block diagram of a specific configuration of a passive type of RFID is shown. In passive RFID 200 in FIG. 20, communicated signals received by an antenna circuit 201 are input into a signal processing circuit 202. Commonly, processing of ASK modulation, PSK modulation, or the like is performed on a carrier wave of 13.56 MHz, 915 MHz, or the like and the communicated signals are transmitted. In FIG. 20, an example of a structure of passive RFID where the frequency of the communicated signal is 13.56 MHz is shown.

In the RFID 200, a standard clock signal for processing signals is needed, and, here, a carrier wave of 13.56 MHz is used as the clock. An amplifier 207 amplifies the 13.56 MHz carrier wave and supplies the 13.56 MHz carrier wave to a logic circuit 208 as a clock. In addition, a communicated signal modulated by ASK modulation or PSK modulation is demodulated by a demodulation circuit 206. The demodulated signal is also transmitted to the logic circuit 208 and analyzed. The signal analyzed by the logic circuit 208 is transmitted to a memory controller circuit 209. Based on this signal, the memory controller circuit 209 controls a memory circuit 210, and data stored in the memory circuit 210 is retrieved and transmitted to a logic circuit 205. After the data is encoded by the logic circuit 205, the signal is amplified by the amplifier 204, and by this signal, modulation is applied to the carrier wave by a modulating circuit 203. Meanwhile, the communicated signals input into a rectifier circuit 220 are rectified and input into a power supply circuit 221. The power supply circuit 221 supplies electric power to the amplifier 207, the demodulation circuit 206, the logic circuit 208, the memory controller circuit 209, the memory circuit 210, the logic circuit 205, the amplifier 204, the modulation circuit 203, and the like. Passive RFID operates in this way.

In active RFID like that shown in FIG. 21, in response to strength settings of signals needed for transmission and reception of information of individual objects, a battery is drained over time, and, finally, electric power needed for communication of information for individual objects comes to be unable to be generated. For this reason, for continued use of a semiconductor device that includes active RFID, operations for checking the remaining capacity of a battery and changing the battery are needed.

Meanwhile, in passive RFID like that shown in FIG. 20, because power for driving is produced using electric power of electromagnetic waves from an external source, securing electric power for transmission of information long distances is difficult and realizing stable communication of information long distances is problematic. For this reason, in passive RFID, the usage range is limited to usage for short-distance communication in which the supply of electric power of electromagnetic waves supplied from an external source comes to be enough.

SUMMARY OF THE INVENTION

In view of the foregoing problem, it is an object of the present invention to provide a semiconductor device by which communication can be performed wirelessly without any need for operations for checking remaining the power supply capacity or changing the power supply, even if there is a power supply installed internally. In addition, it is an object of the present invention to obtain, in a semiconductor device in which communication is performed wirelessly, production of electric power by electromagnetic waves from an external source, extension of the range of communications, and stabilization of the state of communications.

One aspect of a semiconductor device related to the present invention is that the semiconductor device includes a signal processing circuit, an antenna circuit connected to the signal processing circuit, and a storage means for supplying electric power to the signal processing circuit, where the signal processing circuit receives and transmits information through the antenna circuit, generates a direct current voltage from signals received by the antenna circuit, and charges up the storage means.

In a semiconductor device related to the present invention, an antenna circuit includes an antenna portion that receives signals by an electromagnetic induction method or by an electromagnetic coupling method and an antenna portion that receives signals by a microwave method. Furthermore, other antenna circuits include an antenna portion with a coil-shaped conductor and an antenna portion with a pair of linear conductors.

In the present specification, an object that includes an antenna circuit, a circuit for charging a battery with an electromotive force generated by electromagnetic waves received by the antenna circuit, and a medium for charging the electromotive force is referred to as an RF battery or a wireless battery.

There are no particular limitations on the frequency of electromagnetic waves received by the antenna circuit, and, for example, any of the following frequencies can be used: from 300 GHz to 3 THz, which are frequencies of sub-millimeter waves; from 30 GHz to 300 GHz, which are frequencies of millimeter waves; from 3 GHz to 30 GHz, which are frequencies of microwaves; from 300 MHz to 3 GHz, which are frequencies of ultrahigh frequency waves; from 30 MHz to 300 MHz, which are frequencies of ultrashort waves; from 3 MHz to 30 MHz, which are frequencies of shortwaves; from 300 kHz to 3 MHz, which are frequencies of medium waves; from 30 kHz to 300 kHz, which are frequencies of long waves; or from 3 kHz to 30 kHz, which are frequencies of ultra long waves.

It is to be noted that, in the present invention, a semiconductor device refers to a device that includes a circuit that includes a semiconductor element (a transistor, a diode, or the like). In addition, the semiconductor device may be a general device that can function by use of semiconductor characteristics. Furthermore, not only finished products but also intermediate products formed of circuits that include semiconductor elements are also included as semiconductor devices.

It is to be noted that, for a switch shown in the present invention, a variety of modes can be used; for example, there is an electrical switch, a mechanical switch, or the like. That is, there are no particular limitations on the kind of switch as long as it is an object that can control the flow of current. For example, the switch may be a transistor, a diode (a P-N diode, a PIN diode, a Schottky diode, a diode-connected transistor, or the like), or a logic circuit formed of a combination of any of these.

It is to be noted that, in the present invention, there are no limitations on the kind of transistor used. Depending on the characteristics of an integrated circuit of the semiconductor device, a variety of forms of transistor can be applied. There are no limitations on the kind of the transistor that can be applied. A thin film transistor (TFT) that uses a non-single-crystal semiconductor film typified by amorphous silicon or polycrystalline silicon; an MIS transistor formed using a semiconductor substrate or an SOI substrate; a junction-type transistor; a bipolar transistor; a transistor that uses a compound semiconductor such as ZnO, a-InGaZnO, or the like; a transistor that uses an organic semiconductor or a carbon nanotube; or another type of transistor can be applied. It is to be noted that hydrogen or a halogen may be contained in a non-single-crystal semiconductor film, as well.

For the structure of the transistor, various modes can be used. There are no particular limitations on the structure. For example, a multi-gate structure in which there are two or more gates may be used. By use of a multi-gate structure, off current can be reduced, and the dielectric strength voltage and reliability of the transistor can be improved. In addition, the structure may be one in which gate electrodes are placed above and below a channel. By use of a structure in which gate electrodes are placed above and below the channel, because the channel region is increased, the amount of current can be increased, and, furthermore, a depletion layer comes to be easily generated, and a subthreshold value (an S value) can be decreased. The structure may be one in which a gate electrode is placed above a channel or one in which a gate electrode is placed below a channel. A staggered structure or an inverted staggered structure may be used, as well. The channel region may be divided up into a plurality of regions. Furthermore, a source electrode or a drain electrode may overlap with the channel (or with a part of the channel). By use of a structure in which the source electrode or the drain electrode overlaps with the channel (or with a part of the channel), electric charge can be stored in a part of the channel, and operations becoming unstable can be prevented. Moreover, there may be LDD regions. By provision of LDD regions, off current can be reduced and the dielectric strength voltage and reliability of the transistor can be improved, and, even furthermore, in a saturation region, even if the voltage between the drain and the source changes, current-voltage characteristics where the current between the drain and the source does not really change can be obtained.

It is to be noted that, in the present specification, the phrase "to be connected" includes cases where portions are electrically connected to each other and cases where portions are directly connected to each other. Herewith, in a structure disclosed in the present invention, in addition to a given connection relation, one or more additional elements (for example, a switch, a transistor, a capacitor, an inductor, a resistor, a diode, or the like) that can be electrically connected between the things connected in the given connection relationship may be placed therebetween. Alternatively, the additional element or elements are not placed between the things connected in the predetermined connection relationship but may be directly connected thereto and located. It is to be noted that the phrase "directly connected" includes only the case where things are electrically connected to each other where no other elements can be interposed therebetween. For the case where things being electrically connected to each other is not included, the phrase "directly connected" will be used. Also note that, for the phrase "electrically connected," this includes cases where things are electrically connected to each other and cases where the things are directly connected to each other.

It is to be noted that, in the present specification, for phrases like "on" and "over," as in, "formed on something" and "formed over something," this situation is not limited to something being formed on something else and in direct contact with that other thing. This also includes cases where the things do not come into direct contact with each other, that is, cases where something else is interposed between the things. So, for example, for the case, "on a layer A (or over a layer A), a layer B is formed," the case where the layer B is formed on the layer A in direct contact with the layer A is included, and the case where a different layer (for example, a layer C, a layer D, or the like) is formed on the layer A in direct contact with the layer A and then the layer B is formed on that other layer in direct contact with that other layer is also included. Moreover, the phrase, "above something" is similar and is not limited to something being formed on something else and in direct contact with that other thing. This also includes cases where something else is interposed between the things that are formed over each other. For example, for the case, "a layer B is formed above a layer A," the case where the layer B is formed on the layer A in direct contact with the layer A is included, and the case where a different layer (for example, a layer C, a layer D, or the like) is formed on the layer A in direct contact with the layer A and then the layer B is formed on that other layer in direct contact with that other layer is also included. It is to be noted that the phrases "under" or "below" are similar, and the case where things come into direct contact with each other and the case where things do not come into direct contact with each other are included.

One aspect of the semiconductor device of the present invention is that it includes a storage means that can be charged up. As a result, deterioration over time of a battery and lack of electric power occurring with discharge, as occurs in the conventional art, can be prevented. The storage means is not connected to a wiring of a charger, but the storage means can be charged up using electric power of electromagnetic waves received from an external source. Because of this, operations for checking the remaining battery capacity and for changing a battery, as for a battery of active RFID, become needless. Additionally, because electric power for driving the semiconductor device can be stored in the storage means at any time, enough electric power for driving the semiconductor device can be obtained at any time, and stabilized communication can be performed.

Furthermore, in the semiconductor device of the present invention, because signals of frequencies from a plurality of bands can be received, the frequency band of frequencies that can be received is wide. Consequently, the environment in which the storage means can be charged is widened, and charging can be performed efficiently. As a result of this, electric power can be stably supplied to the semiconductor device, and the communication distance can be extended.

BRIEF DESCRIPTION OF THE DRAWINGS

FIGS. 11A to 11D are cross-sectional view diagrams used to describe manufacturing steps for an inlay.

FIGS. 12A to 12C are cross-sectional view diagrams used to describe manufacturing steps for an inlay.

FIGS. 14A and 14B are cross-sectional view diagrams used to describe manufacturing steps for an inlay.

DETAILED DESCRIPTION OF THE INVENTION

Figure 1:
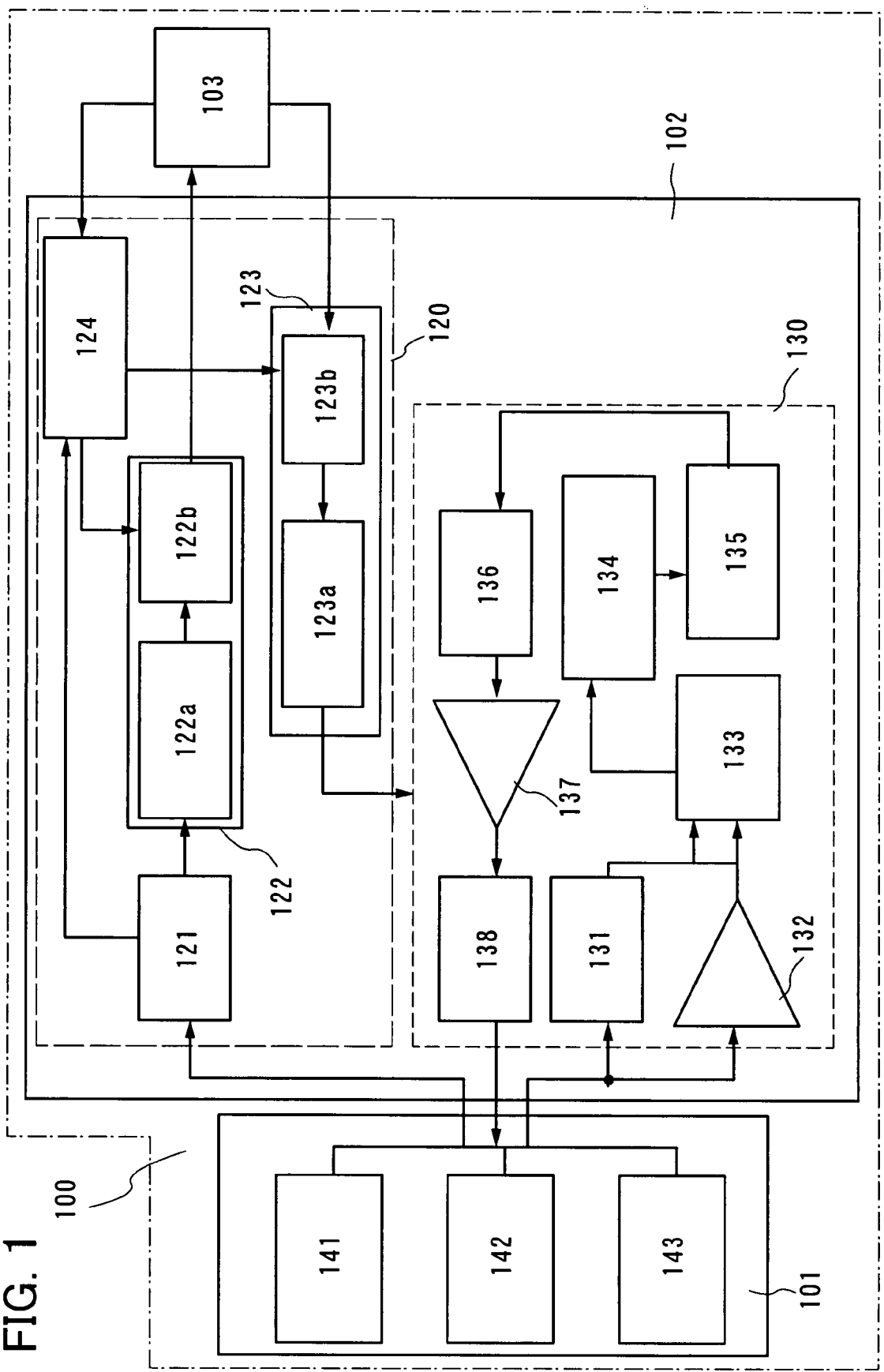
FIG. 1 is a circuit block diagram illustrating an example of a structure of a semiconductor device.

Hereinafter, Embodiment Modes of the present invention will be explained with reference to the drawings. However, the present invention can be implemented in a variety of different modes, and it is to be easily understood by those skilled in the art that various changes and modifications can be made without any departure from the spirit and scope of the present invention. Accordingly, the present invention is not to be taken as being limited to the written description of the embodiment modes included herein. It is to be noted that common reference numerals are used to refer to the same component parts in different figures, and repetitive descriptions thereof are omitted.

Embodiment Mode 1

First, a structure of a semiconductor device related to Embodiment Mode 1 of the present invention will be described briefly. The semiconductor device includes an antenna circuit, a signal processing circuit for processing signals received by the antenna circuit, and a storage means for storing power produced by the signal processing circuit.

The antenna circuit is a circuit that receives and transmits signals. RFID of the present invention has a plurality of antenna portions, and each of the plurality of antenna portions receives signals at a frequency different from that of the others. In addition, an antenna terminal of the plurality of antenna portions is common. That is to say, in an antenna circuit, the plurality of antenna portions is connected to a signal processing section, which is to be described later, through a common antenna terminal.

The signal processing circuit includes a power section and a logic section. The power section generates a direct current voltage from signals received by the antenna circuit. In addition, the power section charges up the storage means with the direct current voltage and supplies the direct current voltage to the logic section. The logic section operates by power supplied via the power section. The logic section is a circuit by which reception signals received by an antenna circuit are analyzed and transmission signals are generated.

The storage means is a medium that stores electric power produced from wireless signals (electromagnetic waves). For the storage means, a storage battery (battery) such as a lithium-ion battery, a lithium secondary battery, a nickel hydride battery, a nickel-cadmium battery, an organic radical battery, or the like can be used. The type of storage battery is not limited to these. Alternatively, a capacitor such as a capacitor with a large storage capacity or the like can be used for the storage means. For a capacitor, a layered ceramic capacitor or an electric double layer capacitor can be used.

Next, using FIG. 1, an example of a structure of a semiconductor device 100 will be described. FIG. 1 is a block diagram of the semiconductor device 100. The semiconductor device 100 includes an antenna circuit 101, a signal processing circuit 102, and a storage means 103.

The antenna circuit 101 includes a plurality of antenna portions that perform transmission and reception of signals. In FIG. 1, an example is shown that includes three antenna portions 141, 142, and 143. Each of the antenna portions 141, 142, and 143 detects signals at a frequency different from that of the others. Consequently, the semiconductor device 100 can communicate by non-contact by signals of a plurality of frequencies. In addition, in conventional RFID that uses an antenna circuit formed of one antenna portion, direct current power is generated from signals of a particular frequency only; however, because the semiconductor device 100 can detect signals from a wide range and convert those signals into direct current power, even more electric power can be generated. It is to be noted that a specific structure of the antenna circuit 101 will be described in Embodiment Mode 2.

For the storage means 103, a so-called storage battery (battery) can be applied. For example, a secondary battery such as a lithium-ion battery, a lithium secondary battery, a nickel hydride battery, a nickel-cadmium battery, an organic radical battery, a lead storage battery, an air secondary battery, a nickel-zinc battery, a silver zinc battery, or the like can be applied. It is to be noted that, for the storage means 103, in addition to a storage battery (battery), a capacitor that is a capacitor with a large capacity (for example, a layered ceramic capacitor, an electric double layer capacitor, or the like) can be applied. In particular, because the charge and discharge capacity of a lithium-ion battery and a lithium secondary battery are large, the storage means 103 can be made to be small and light-weight, which is suitable for the semiconductor device 100. In a metal lithium battery, by use of a transition metal oxide that contains lithium ions, a metal oxide, a metal sulfide, an iron-based compound, a conductive polymer, an organic sulfur-based compound, or the like for a cathode active material; use of lithium (an alloy) for an anode active material; and use of an organic-based electrolyte solution, a polymer electrolyte, or the like for an electrolyte, the charge and discharge capacity can be increased.

By formation of the active material and electrolyte of a lithium-ion battery by a sputtering method, the storage means 103 can be formed over a substrate over which the signal processing circuit 102 is formed or, alternatively, over a substrate over which the antenna circuit 101 is formed.

The signal processing circuit 102 is roughly divided into a power section 120 and a logic section 130. The power section 120 includes, as shown in FIG. 1, a rectifier circuit 121 that is connected to an output of the antenna circuit 101, a charging controller circuit 122 that is connected to an output of the rectifier circuit 121, a power circuit 123 that is connected to an output of the storage means 103, and a power supply controller circuit 124 that controls the charging controller circuit 122 and the power circuit 123.

The charging controller circuit 122 includes a regulator 122a and a switch 122b that is connected to an output of the regulator 122a. The output of the regulator 122a is connected to the storage means 103 through the switch 122b.

The rectifier circuit 121 performs half-wave rectification of alternating current signals received by the antenna circuit 101, smoothes the alternating current signals, and produces a direct current voltage. The direct current voltage output from the rectifier circuit 121 is set to be a direct current voltage of a constant voltage that is input to the regulator 122a of the charging controller circuit 122. The regulator 122a outputs the generated constant voltage to the storage means 103 through the switch 122b and charges the storage means 103. The regulator 122a is a circuit that maintains a constant voltage so that a voltage exceeding specifications is not applied to the storage means 103. It is to be noted that not only the voltage of the input direct current voltage but the current thereof may also be set by the regulator 122a so as to be constant. In addition, if the switch 122b is set to be a rectifier element like a diode, the regulator 122a may be omitted. That is, the charging controller circuit 122 can be set to have a simple structure that includes a rectifier element only.

The power circuit 123 includes a regulator 123a and a switch 123b that is connected to an input of the regulator 123a. The input of the regulator 123a is connected to an output of the storage means 103 through the switch 123b. An output of the regulator 123a is connected to the logic section 130. Electric power by which the storage means 103 is charged is supplied to the logic section 130 from the power supply circuit 123. The power supplied from the storage means 103 is set to be a constant voltage power supply by the regulator 123a, whereby input to the logic section 130 of a voltage exceeding specifications can be prevented. It is to be noted that not only the voltage of the input direct current voltage but the current thereof may also be set by the regulator 123a so as to be constant.

The power supply controller circuit 124 is a circuit that controls charging of the storage means 103 and supply of power to the logic section 130. An output of the storage means 103 is connected to the power supply controller circuit 124, and the state of charge of the storage means 103 is monitored using this output. In addition, an output of the rectifier circuit 121 is connected to the power supply controller circuit 124, and from this output, the magnitude of the amplitude (the magnitude of the electric field) of signals received by the antenna circuit 101 is monitored. The power supply controller circuit 124 monitors the output of the storage means 103 and the rectification circuit 121 and controls ON and OFF of the switch 122b and switch 123b. For example, for the control of the switch 123b, the switch 123b is turned ON when the amount of voltage of the storage means 103 reaches or exceeds a given value, $V_1$, and electric power of the storage means 103 is supplied to the logic section 130. When the amount of voltage drops to or below a given value, $V_2$ ($V_1 > V_2$), the switch 123b is turned OFF, and the supply of electric power to the logic section 130 is stopped. For example, the set value for $V_1$ is set to be an amount of voltage by which the logic section 130 can be driven stably, and the set value for $V_2$ is set to be the minimum amount of voltage needed for driving the logic section 130.

The logic section 130 includes a demodulation circuit 131, an amplifier 132, a logic circuit 133, a memory controller circuit 134, a memory circuit 135, a logic circuit 136, an amplifier 137, and a modulation circuit 138, each of which is connected as shown in FIG. 1.

In the semiconductor device 100 shown in FIG. 1, an RF battery is formed of the antenna circuit 101, the power section 120, and the storage means 103. Hereinafter, a method for charging the RF battery and for supplying electric power stored in the RF battery to the signal processing circuit 102 will be described.

In the semiconductor device 100, the storage means 103 can be charged automatically by reception of electromagnetic waves. In addition, because the antenna circuit 101 can receive signals from a plurality of frequency bands, signals from a wide band can be detected and converted to direct current power, whereby an even greater amount of electric power can be generated. Furthermore, in exchange for a reader/writer, by use of a so-called charger, a device that can transmit electromagnetic waves exclusively used for charging, the storage means 103 can be charged intentionally and the situation where electric power in the semiconductor device 100 is drained can be prevented. Because a reader/writer includes a function for transmitting signals exclusively used for charging, the reader/writer can be made to function as a charger, as well.

Figure 2A:
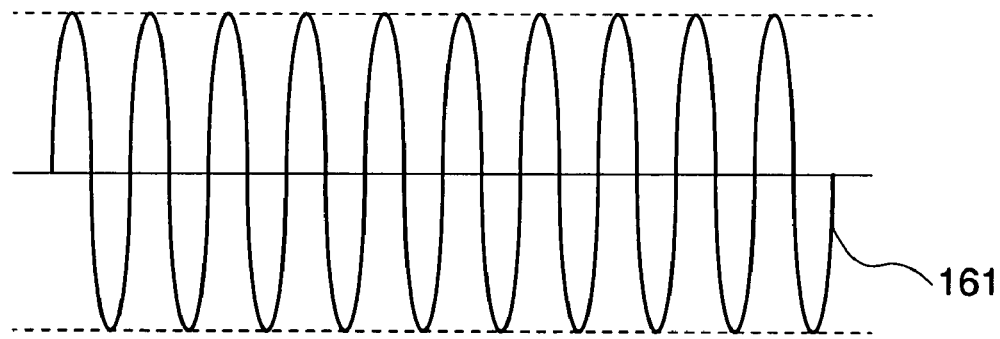
FIGS. 2A to 2C are diagrams used to describe changes in the magnitude of a signal received by a semiconductor device.
Figure 2B:
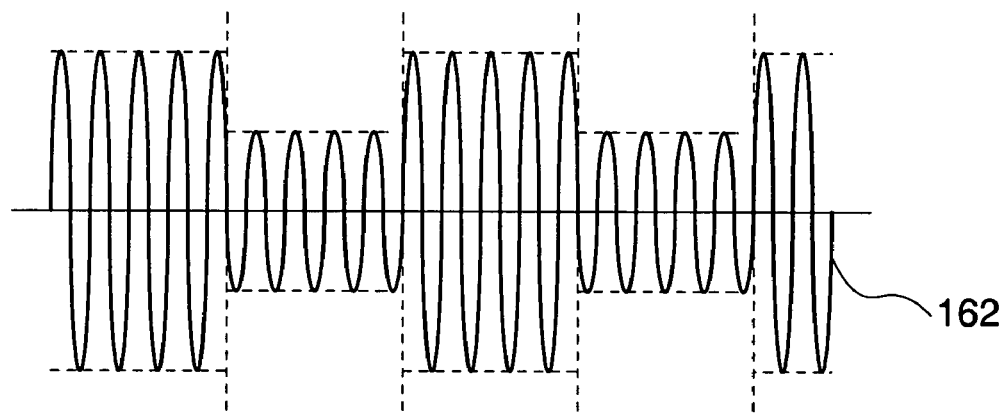
Figure 2C:
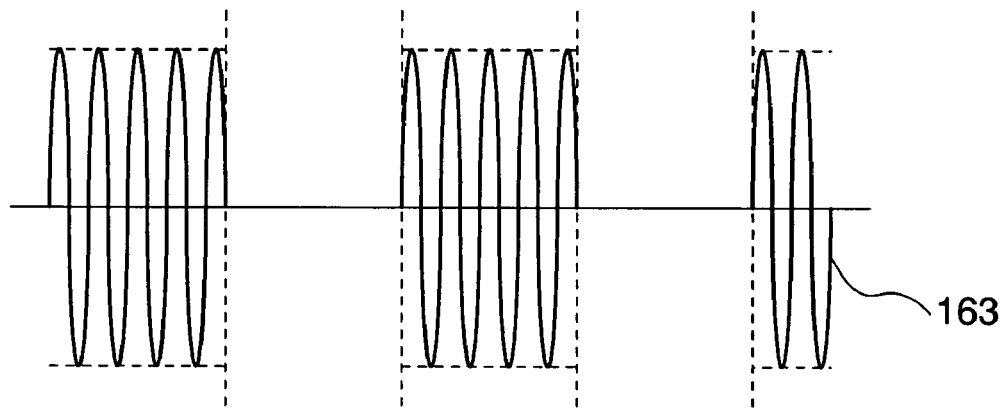

Operation methods performed when the storage means 103 of the semiconductor device 100 is being charged are roughly divided into two kinds. One is an operation method for when signals are received as electromagnetic waves 161 (refer to FIG. 2A) where the amplitude of the signals does not change; the other is an operation method for when signals are received as electromagnetic waves 162 or electromagnetic waves 163 (refer to FIGS. 2B and 2C) where the amplitude of the signals does change. FIGS. 2A to 2C are diagrams used to describe changes in the amplitude of signals that the semiconductor device 100 receives. First, the first operation method will be described.

The simplest charging method is a case where the electromagnetic waves 161 of equal amplitude, as shown in FIG. 2A, are received. From an antenna of the charger or reader/writer, signals of equal amplitude exclusively used for charging are transmitted. If the semiconductor 100 receives those signals, a direct current voltage is produced in the rectifier circuit 121. If the amount of direct current voltage of the rectifier circuit 121 is greater than or equal to a constant value, $V_a$, the power supply controller circuit 124 turns the switch 122$b$ ON so that charging of the storage means 103 is started.

It is to be noted that when the output voltage of the rectifier circuit 121 is lower than the specified voltage, $V_a$, the power supply controller circuit 124 turns the switch 122$b$ OFF and terminates the connection with the storage means 103 and the rectifier circuit 121. In this way, with the switch 122$b$ turned OFF, a backflow of electric power from the storage means 103 to the antenna circuit 121 can be prevented.

Moreover, the power supply controller circuit 124 monitors the output voltage from the storage means 103, and, when this output voltage is lower than the given value, $V_2$, (for example, the minimum amount of voltage needed for driving the logic section 130), the power supply controller circuit 124 turns the switch 123$b$ OFF so that the supply of electric power to the logic section 130 is stopped.

When the switch 122$b$ comes to be ON, the storage means 103 is charged up. The power supply controller circuit 124 monitors the output voltage from the storage means 103, and, when this output voltage reaches or exceeds $V_1$, the switch 123$b$ is turned ON, and the supply of electric power to the logic section 130 is started. Furthermore, when this output voltage reaches or exceeds a constant value, $V_3$, the switch 122$b$ is turned OFF, and charging of the storage means 103 is terminated. It is to be noted that the amount of the voltage $V_3$ is set so that overcharging of the storage means 103 is prevented and set so that $V_3 > V_1 > V_2$.

In order that charging be terminated, a signal communicating to the charger or reader/writer (hereinafter, referred to as "the charger or the like") that charging is to be terminated may be set so as to be transmitted by the semiconductor device 100. For example, control signals of the power supply controller circuit 124 may be set so as to be input to the logic section 130. From the power supply controller circuit 124, a signal communicating that the output voltage of the storage means 103 has reached or exceeded the constant value, $V_3$, is input to the logic section 130. The logic section 130 generates transmission signals communicating that charging has been terminated and transmits these signals through the antenna circuit 101. The charger or the like receives these signals, and the transmission of signals exclusively used for charging is stopped.

When the charger or the like and the semiconductor device 100 are communicating information (data) with each other, electromagnetic waves (carrier waves) of different amplitudes, as shown in FIGS. 2B and 2C, are used. Here, the electromagnetic waves 162 shown in FIG. 2B are signals where the amplitude of the electromagnetic waves changes without becoming zero. The electromagnetic waves 163 shown in FIG. 2C are signals in which the case when the amplitude of the electromagnetic waves is zero is included and both ON and OFF signals are included.

When signals from the charger or the like are received by the antenna circuit 101, a direct current voltage is produced in the rectifier circuit 121. In order to check whether the amplitude of the signals received by the power supply controller circuit 124 does or does not exceed a specified voltage, the power supply controller circuit 124 monitors the output voltage of the rectifier circuit 121. When the output voltage is lower than the given voltage, $V_a$, the switch 122$b$ is turned OFF, and the connection between the storage means 103 and the rectifier circuit 121 is terminated. With the switch 122$b$ turned OFF, a backflow of electric power from the storage means 103 to the antenna circuit 101 can be prevented. When the amplitude of the electromagnetic waves 162 shown in FIG. 2B is decreased or the amplitude of the electromagnetic waves 163 shown in FIG. 2C is zero, the switch 122$b$ is turned OFF.

If the direct current voltage of the rectifier circuit 121 reaches or exceeds the fixed value, $V_a$, the power supply controller circuit 124 turns the switch 122$b$ ON so that charging of the storage means 103 is started. Times when the switch 122$b$ is turned ON are times when the amplitude of the electromagnetic waves 162 shown in FIG. 2B and the amplitude of the electromagnetic waves 163 shown in FIG. 2C are each increased.

When charging is begun, the output voltage of the storage means 103 also increases. The power supply controller circuit 124 turns the switch 123$b$ ON when this output voltage reaches or exceeds $V_1$ and begins the supply of electric power to the logic section 130. Furthermore, when this output voltage reaches or exceeds the constant value, $V_3$, the power supply controller circuit 124 turns the switch 122$b$ OFF and stops the charging of the storage means 103.

When communication of data is performed by the semiconductor device 100, the power supply controller circuit 124 may control the switch 122$b$ so that the switch 122$b$ is turned OFF and charging of the storage means 103 is stopped, or communication may be set to be performed with the switch 122$b$ left ON during the communication of data and while the storage means 103 is being charged.

In the antenna circuit 101, because the antenna circuit 101 can receive signals at a plurality of frequency bands, signals of a different frequency can be used for the electromagnetic waves for charging than that of signals for the electromagnetic waves for transmission. In this case, if the electromagnetic waves 161 of equal amplitude shown in FIG. 2A are used for the signals for charging, charging can be performed efficiently.

Hereinafter, signal processing for reading and writing of data will be described. It is to be noted that, in order to simplify the description, in the antenna circuit 101, the antenna portion 141 will be set to be an antenna that responds to 13.56 MHz signals, the antenna portion 142 will be set to be an antenna that responds to 915 MHz signals in the UHF band, and the antenna portion 143 will be set to be an antenna that responds to 2.45 GHz signals. With use of this kind of antenna circuit 101, by signals of a plurality of frequency bands, reading and writing of information can be performed by the signal processing circuit 102. Consequently, reading information and writing information of received signals can be made to differ from frequency to frequency.

For example, a case for when the frequency of communicated signals is 13.56 MHz is supposed. Communicated signals are received by the antenna portion 141 of the antenna circuit 101. The communicated signals received by the antenna portion 141 are input to the demodulation circuit 131 and the amplifier 132. Generally, because the communicated signals are signals which are carrier waves with a frequency of 13.56 MHz, 915 MHz, or the like that are modulated by such as ASK modulation and PSK modulation, the demodulation circuit 131 is necessary. It is to be noted that, when the signals received by the antenna circuit 101 are signals on which modulation is not performed (unmodulated signals), the demodulation circuit 131 is not needed.

For processing of signals, a clock signal acting as a reference is needed. In this example, because the frequency of the communicated signals is 13.56 MHz, a frequency of 13.56 MHz comes to be used for the clock as well. The amplifier 132 amplifies a 13.56 MHz carrier wave and supplies the carrier wave to the logic circuit 133 as the clock. In addition, the communicated signals that are modulated by ASK modulation or PSK modulation are demodulated by the demodulation circuit 131. The demodulated signals are also sent to and analyzed by the logic circuit 133. The signals analyzed by the logic circuit 133 are sent to the memory controller circuit 134. The memory controller circuit 134 controls the memory circuit 135 in accordance with the input signals. The memory controller circuit 134 retrieves data stored in the memory circuit 135, and the retrieved data is sent to the logic circuit 136. The data sent to the logic circuit 136 is amplified by the amplifier 137 after being encoded by the logic circuit 136. The modulation circuit 138 performs modulation on the amplified signals. The modulated signals are transmitted by the antenna circuit 101.

Here, a case where the frequency of communicated signals is 13.56 MHz was given; however, cases where the frequency of communicated signals is 915 MHz or 2.45 GHz are similar, and the antenna portion that receives signals in the antenna circuit 101 differs depending on the frequency. It is to be noted that there are no particular limitations on the frequency of the electromagnetic waves received by the antenna circuit 101. For example, any of the following frequencies can be used: from 300 GHz to 3 THz, which are frequencies of sub-millimeter waves; from 30 GHz to 300 GHz, which are frequencies of millimeter waves; from 3 GHz to 30 GHz, which are frequencies of microwaves; from 300 MHz to 3 GHz, which are frequencies of ultrahigh frequency waves; from 30 MHz to 300 MHz, which are frequencies of ultrashort waves; from 3 MHz to 30 MHz, which are frequencies of shortwaves; from 300 kHz to 3 MHz, which are frequencies of medium waves; from 30 kHz to 300 kHz, which are frequencies of long waves; or from 3 kHz to 30 kHz, which are frequencies of ultra long waves.

Embodiment Mode 2

A transmission method for wireless communication signals depends on the frequency of the signals used for communication. For example, when the frequency is in the long wavelength region (for example, at a frequency band of 135 kHz or less) or in the shortwave band (for example, at the 13.56 MHz frequency band), the transmission method used is an electromagnetic coupling method or an electromagnetic induction method. On the other hand, when the frequency of the signals is in the UHF band (from 860 MHz to 930 MHz) or at the 2.45 GHz band, the transmission method used is a microwave method (also referred to as a radio wave method).

The shape of an antenna portion in an antenna circuit differs greatly depending on the transmission method used. For the electromagnetic coupling method or the electromagnetic induction method, because electromagnetic induction by variations in the magnetic field density is used, a conductor that functions as the antenna portion is a ring shape (for example, a loop shape, a coil shape, or the like).

On the other hand, for the microwave method, a conductor that functions as the antenna portion is not a ring shape but is formed as a pole shape (a linear shape) or as a planar shape (for example, formed as a patch antenna).

In the present embodiment mode, the antenna circuit 101 of the semiconductor device 100 is set to have a structure by which signals can be transmitted by both an electromagnetic induction method (or an electromagnetic coupling method) and a microwave method. By the structure being set as one in which the antenna circuit can communicate by both transmission methods, the frequency band at which detection can be made can be set to cover an extremely wide band (for example, from 13.56 MHz to 2.45 GHz). By application of the antenna circuit of the present embodiment mode, the semiconductor device 100 can receive signals from 13.56 MHz to 2.45 GHz, produce direct current power from those signals, and store electricity in the storage means 103.

Figure 3:
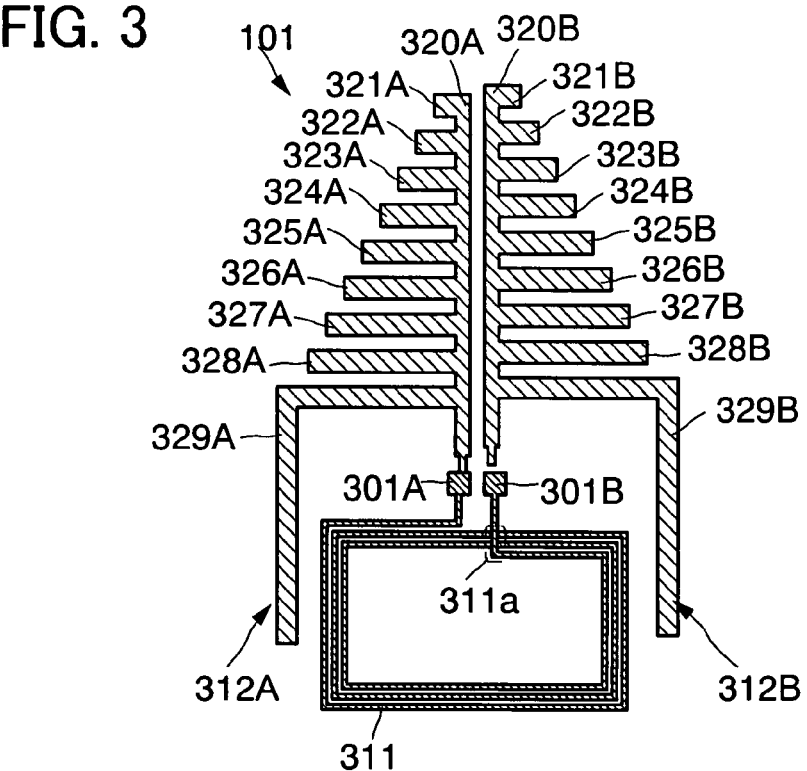
FIG. 3 is a plane-view diagram illustrating an example of a structure of an antenna circuit.
Figure 4:
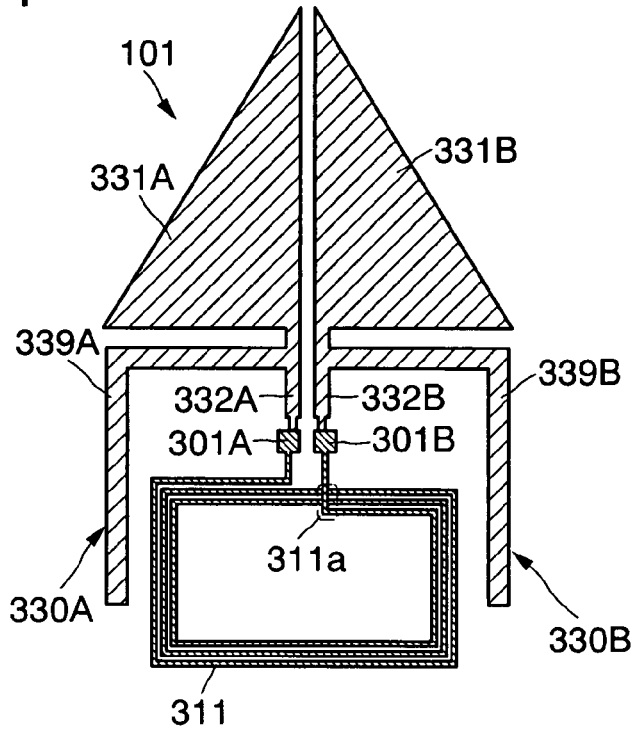
FIG. 4 is a plane-view diagram illustrating an example of a structure of an antenna circuit.

FIG. 3 and FIG. 4 are plane-view diagrams each illustrating an example of a structure of the antenna circuit 101. In FIG. 3 and FIG. 4, a different structure of the antenna circuit 101 is shown in each diagram.

First, using FIG. 3, a structure of the antenna circuit 101 will be described. The antenna circuit 101 includes antenna terminals 301A and 301B and a plurality of antenna portions (311, 321 to 329) connected to the antenna terminals 301A and 301B. It is to be noted that because including reference numerals 321 to 329 would make the diagram more complicated, reference numerals for the antenna portions 321 to 329 are omitted from FIG. 3.

One of the antenna portions is the antenna portion 311, by which communication is performed by an electromagnetic induction method (or an electromagnetic coupling method). The antenna portion 311 is an antenna coil formed of a conductor that is formed into a coil shape; of the two terminals of the conductor, one terminal is connected to the antenna terminal 301A, and the other terminal is connected to the antenna terminal 301B. For example, the antenna portion 311 can be used as an antenna that receives signals at the 13.56 MHz band. It is to be noted that in a portion 311a in which the conductor of the antenna portion 311 overlaps with itself, an insulating layer is provided so that short circuits do not occur.

The antenna portions 321 to 329 are antennas that receive signals by a microwave method. The antenna portions 321 to 329 are formed of two conductors 312A and 312B. The conductor 312A is connected to the antenna terminal 301A, and the conductor 312B is connected to the antenna terminal 301B. The conductor 312A and the conductor 312B are formed of congruent shapes and arranged axisymmetrically with a space between them.

Figure 5:
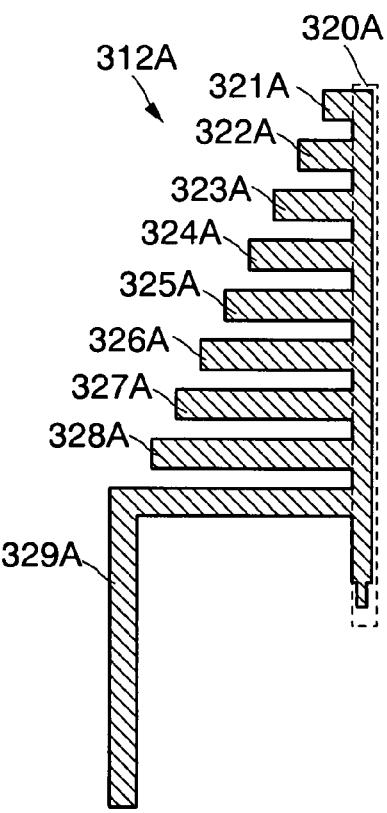
FIG. 5 is a plane-view diagram illustrating a part of a conductor of the antenna circuit of FIG. 3.

As shown in FIG. 5, the conductor 312A is formed of a linear conductor 320A and nine linear conductors 321A to 329A that branch out from the conductor 320A. The conductor 312B is formed, in a similar way, of a conductor 320B and nine conductors 321B to 329B. Each of the antenna portions 321 to 329 is formed as a dipole antenna of these conductors.

In the antenna portion 321, one pole is formed of the conductors (320A and 321A), and the other pole is formed of the conductors (320B and 321B). In the antenna portion 322, one pole is formed of the conductors (320A and 322A), and the other pole is formed of the conductors (320B and 322B). In the antenna portion 323, one pole is formed of the conductors (320A and 323A), and the other pole is formed of the conductors (320B and 323B). In the antenna portion 324, one pole is formed of the conductors (320A and 324A), and the other pole is formed of the conductors (320B and 324B). In the antenna portion 325, one pole is formed of the conductors (320A and 325A), and the other pole is formed of the conductors (320B and 325B). In the antenna portion 326, one pole is formed of the conductors (320A and 326A), and the other pole is formed of the conductors (320B and 326B). In the antenna portion 327, one pole is formed of the conductors (320A and 327A), and the other pole is formed of the conductors (320B and 327B). In the antenna portion 328, one pole is formed of the conductors (320A and 328A), and the other pole is formed of the conductors (320B and 328B). In the antenna portion 329, one pole is formed of the conductors (320A and 329A), and the other pole is formed of the conductors (320B and 329B). It is to be noted that, in the antenna portions 321 to 329, a part of the conductors 320A and 320B is used to form an antenna.

For example, as the length (from the tip of the conductor 321A to the tip of the antenna terminal side of the conductor 320A) of one of the poles of the antenna portion 321 and the length (from the tip of the conductor 323A to the tip of the antenna terminal side of the conductor 320A) of one of the poles of the antenna portion 323 differ from each other, because the pole lengths of the antenna portions 321 to 329 differ from each other, the antenna portions 321 to 329 can receive signals of frequency bands differing from each other.

For example, the shortest antenna portion 321 is set to respond to the 2.45 GHz band, and the longest antenna portion 329 is set to respond to the 300 kHz band. The remaining antenna portions, antenna portions 322 to 328, may be set to respond to frequencies corresponding to their lengths. For example, the antenna portion 323 can be set to respond to the 1.5 GHz band, the antenna portion 325 can be set to respond to the 953 MHz band, and the antenna portion 327 can be set to respond to the 800 MHz band so that signals of the UHF band (the 860 MHz to 930 MHz band) can be set to be received. In addition, any of the antenna portions 321 to 329 may be set to respond to frequencies used for transmission and reception of information.

Hence, the antenna circuit 101 shown in FIG. 3 can detect frequencies from a wide band of from 13.56 MHz to 2.45 GHz. It is to be noted that, in the antenna circuit 101 shown in FIG. 3, all of the antenna portions 311 and 321 to 322 are used in the generation of direct current power from received signals, but, depending on the structure of the signal processing circuit 102, of the antenna portions 311 and 321 to 322, there is one or more not used for communication of information.

Next, the structure shown in FIG. 4 of the antenna circuit 101 will be described. The antenna circuit 101 includes the antenna terminals 301A and 301B and a plurality of antenna portions (311, 331, and 339) connected to the antenna terminals 301A and 301B. It is to be noted that because including reference numerals 331 and 339 would make the diagram more complicated, reference numerals for the antenna portions 331 and 339 are omitted from FIG. 4.

The structure of the antenna portion 311 is the same as that of FIG. 3. The antenna portions 331 and 339 are antennas that receive signals by a microwave method. The antenna portions 331 and 339 are formed of two conductors 330A and 330B. The conductor 330A is connected to the antenna terminal 301A, and the conductor 330B is connected to the antenna terminal 301B. The conductor 330A and the conductor 330B are formed of congruent shapes and arranged axisymmetrically with a space between them.

Figure 6:
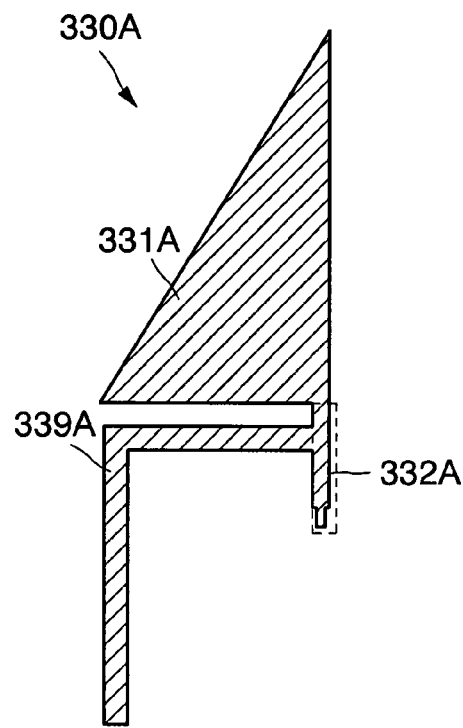
FIG. 6 is a plane-view diagram illustrating a part of a conductor of the antenna circuit of FIG. 4.

As shown in FIG. 6, the conductor 330A is formed of a right triangular conductor 331A and a linear conductor 339A that are connected to each other and a linear conductor 332A that is connected to the antenna terminal 301A. The conductor 330B is formed, with the same structure as the conductor 330A, of a right triangular conductor 331B and a linear conductor 332B.

The antenna portion 331 corresponds to a planar antenna portion of the antenna portions 321 to 328 in FIG. 3 combined. In the antenna portion 331, one of the conductors is formed of the conductors (331A and 332A), and the other one is formed of the conductors (331B and 332B). By formation of the conductors 331A and 331B of the antenna portion 331 into right triangular conductors, when the tip of the antenna is moved along the opposite side from a vertex other than the vertex of the right angle to the other vertex, the distance from the tip of the antenna to the antenna terminal changes continuously. Consequently, the antenna portion 331 can be set to be a wideband antenna. For example, the antenna portion 331 can be set so that it can receive signals from the UHF band (the 860 MHz to 930 MHz band).

The antenna portion 339 has the same structure as the antenna portion 329 of FIG. 3 and is a dipole antenna. One of the conductors of the antenna portion 339 is formed of the conductors (332A and 339A), and the other one is formed of the conductors (332B and 339B). The antenna portion 339, for example, may be set so that signals of the 2.45 GHz band can be received.

In the antenna circuit 101 shown in FIG. 4, because the antenna portion 311 can be used as an antenna that receives signals at the 13.56 MHz band, for the entire antenna circuit 101, the antenna circuit 101 shown can detect frequencies from a wide band of from 13.56 MHz to 2.45 GHz. It is to be noted that, in the antenna circuit 110 shown in FIG. 4, the antenna portions 311, 331, and 339 are used in the generation of direct current power from received signals, but, depending on the structure of the signal processing circuit 102, of the antenna portions 311, 331, and 339, there is one or more not used for communication of information.

Embodiment Mode 3

In the present embodiment mode, as one feature of a semiconductor device of the present invention, an inlay that is used in an IC tag will be described. The inlay is an intermediate product for a final product of an IC tag or an IC card. The inlay is embedded in a plastic card, attached to a sticker label, or made into paper and used as an IC card, an ID label, or an IC tag.

FIG. 7, FIG. 8, FIG. 9, and FIG. 10 are perspective-view diagrams each illustrating an example of a structure of an inlay of the present embodiment mode. In each of FIG. 7, FIG. 8, FIG. 9, and FIG. 10, an example in which the structure of the antenna circuit 101 in FIG. 3 is used as an antenna circuit, but the antenna circuit shown in FIG. 4 or an antenna circuit with a different structure can be used. Hereinafter, structures of the inlays shown in FIG. 7, FIG. 8, FIG. 9, and FIG. 10 will be described.

Figure 7:
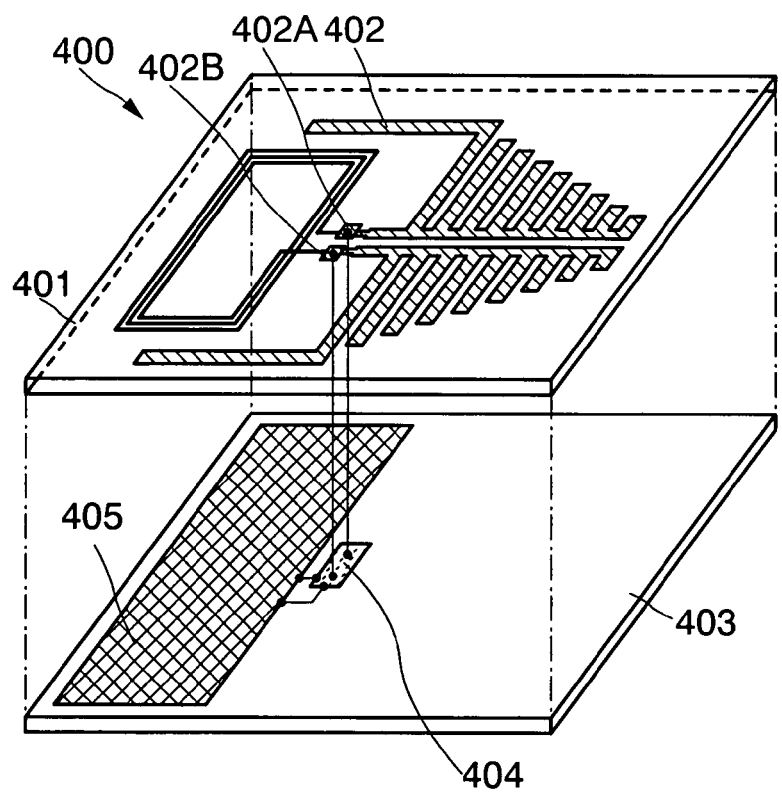
FIG. 7 is an exploded-view perspective diagram illustrating an example of a structure of an inlay.

FIG. 7 is an exploded-view perspective diagram of an inlay 400. A substrate 401 is a supporting substrate for an antenna circuit. An antenna circuit 402 is formed over the substrate 401. In addition, an integrated circuit 404 and a storage means 405 are formed over a substrate 403. The integrated circuit 404 includes the signal processing circuit 102 of the semiconductor device 100 shown in FIG. 1. The storage means 405 corresponds to the storage means 103 of FIG. 1 and is connected to the integrated circuit 404. In FIG. 7, the antenna circuit 402 is formed on the side that faces the substrate 403, and the integrated circuit 404 and the storage means 405 are formed on the side that faces the substrate 401.

It is to be noted that, in FIG. 7, the substrate 401 and the substrate 403 are formed of the same shape and size, but the shapes and sizes of the substrate 401 and the substrate 403 may differ.

Using a flexible substrate for the substrate 401 is preferable so that the inlay 400 can be bent or twisted. For this kind of substrate, paper, nonwoven fabric, a resinous film substrate (for example, a plastic film), a film formed of an inorganic substance, and the like can be given.

For specific examples of a material of a resin film substrate, there are polyethylene terephthalate (PET), polyether sulfone (PES), polyethylene naphthalate (PEN), polycarbonate (PC), a polyamide synthetic fiber (nylon), polyetheretherketone (PEEK), polysulfone (PSF), polyetherimide (PEI), polyarylate (PAR), polybutylene terephthalate (PBT), polyimide, acrylonitrile butadiene styrene resin, polyvinyl chloride, polypropylene, polyvinyl acetate, an acrylic resin, and the like.

In FIG. 7, an example is shown in which the storage means 405 is manufactured during a step in which the integrated circuit 404 is fabricated. It is to be noted that the substrate 403 supporting the integrated circuit 404 is a substrate used when the integrated circuit 404 is fabricated. For example, a semiconductor substrate (specifically, a silicon wafer), a glass substrate, a quartz substrate, a ceramic substrate, or the like is used for the supporting substrate at the time of production of the integrated circuit 404. Note that, after fabrication of the integrated circuit 404 and the storage means 405 is completed, it is preferable that a grinding process, a polishing process, an etching process or the like be performed on these substrates to thin the substrate. By performance of steps in this way, the inlay 400 can be thinned and its weight reduced and it can be bent more easily.

Furthermore, the substrate 403 can be set to be a substrate that differs from the substrate used at the time of production of the integrated circuit 404. As in Embodiment Mode 4 that will be given below, the integrated circuit 404 may be separated from the substrate used at the time of production of the integrated circuit 404 and transposed to a different substrate. For the substrate to which the integrated circuit 404 is transposed, a flexible substrate like the one used for the substrate 401 can be used.

In production of the storage means 405 and the integrated circuit 404 shown in FIG. 7 together, a manufacturing device used in manufacturing of the integrated circuit 404 may be set to have a structure by which the storage means 405 can be manufactured. When a secondary battery is used for the storage means 405, an active material and an electrolyte may be formed by a film formation method such as a sputtering method or the like. For example, a lithium secondary battery can be thinned to about 10 μm to 100 μm and manufactured with the integrated circuit. Even if a capacitor with a large capacity is used for the storage means 405, it can be manufactured with the integrated circuit.

In the inlay 400 of FIG. 7, the substrate 401 and the substrate 403 are fixed so as to be close to each other, and the integrated circuit 404 is connected to antenna terminals 402A and 402B of the antenna circuit 402. For example, the integrated circuit 404 can be connected to the antenna terminals 402A and 402B by solder, a conductive adhesive, or the like.

Figure 8:
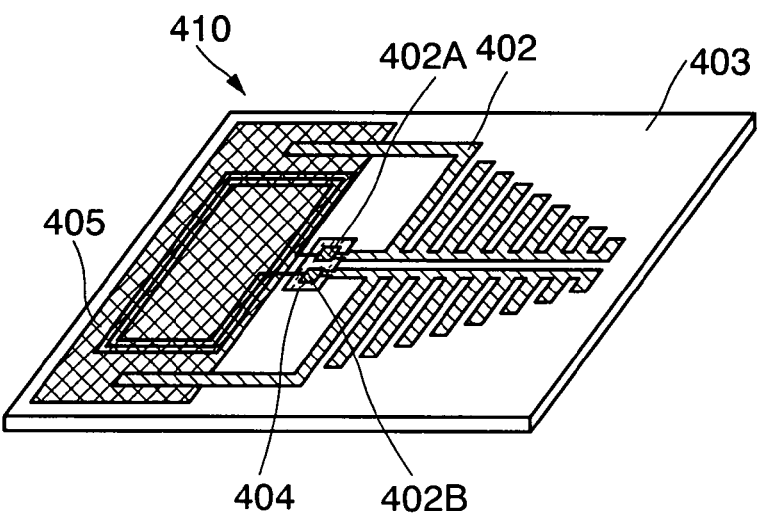
FIG. 8 is a perspective diagram illustrating an example of a structure of an inlay.

Using FIG. 8, an example of an inlay with a different structure will be described. FIG. 8 is a perspective diagram of an inlay 410. The inlay 400 of FIG. 7 is an example of a structure in which the antenna circuit 402 and the integrated circuit 404 are provided over separate substrates. In the inlay 410, the antenna circuit 402 is provided over the substrate 403 that supports the integrated circuit 404. The antenna circuit 402 is provided over the integrated circuit 404 and the storage means 405 so as to overlap with these. For example, the antenna circuit 402 is formed by a process in which a conductive film is formed by a sputtering method or the like and formed into a given shape by etching. In the inlay 410, by the supporting substrate being shared by the integrated circuit 404 and the antenna circuit 402, thinning the structure of the inlay 400 is easy to do.

Figure 9:
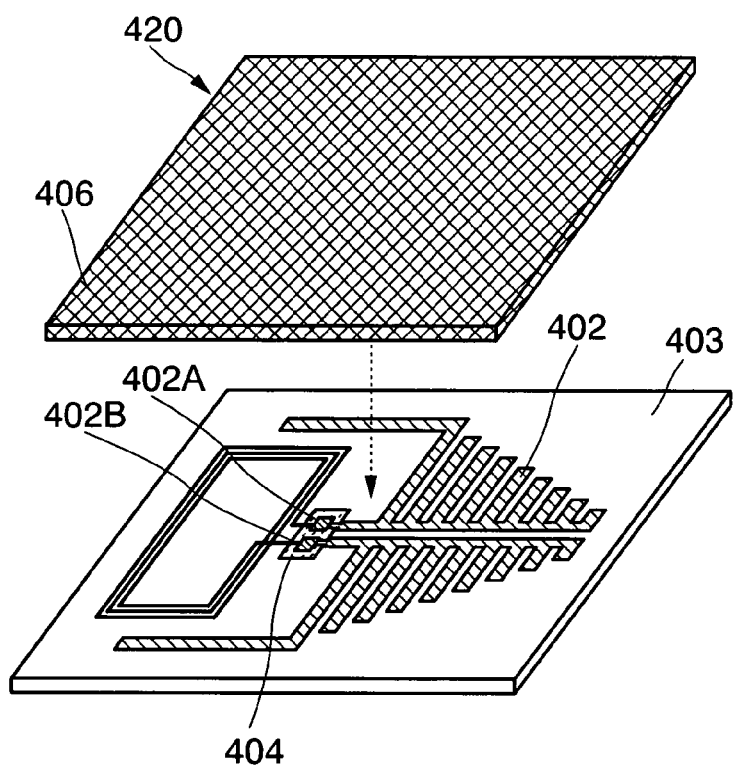
FIG. 9 is an exploded-view perspective diagram illustrating an example of a structure of an inlay.

Using FIG. 9, an example of an inlay with a different structure will be described. FIG. 9 is an exploded-view perspective diagram of an inlay 420. The inlay 420 is a variation of the inlay 410. The structure of the inlay 410 is a structure in which the storage means 405 is manufactured with the integrated circuit 404. The inlay 420 is an example that uses a storage means 406 that is not manufactured with the integrated circuit 404 but is manufactured as a separate component. For the shape of the storage means 406, use of a flat object is preferable in order to thin the inlay 420. The storage means 406 is connected to the integrated circuit 404 and affixed to the substrate 403. To connect the integrated circuit 404 and the storage means 406 to each other, for example, an anisotropic conductive adhesive, solder, or the like can be used.

It is to be noted that, in FIG. 9, an example is shown in which the storage means 406 is affixed to the substrate 403 on the side on which the integrated circuit 404 is formed, but the storage means 406 can be affixed to the substrate 403 on the opposite side, as well. For this case, for connecting the storage means 406 and the integrated circuit 404 to each other, an opening may be formed in the substrate 403.

Figure 10:
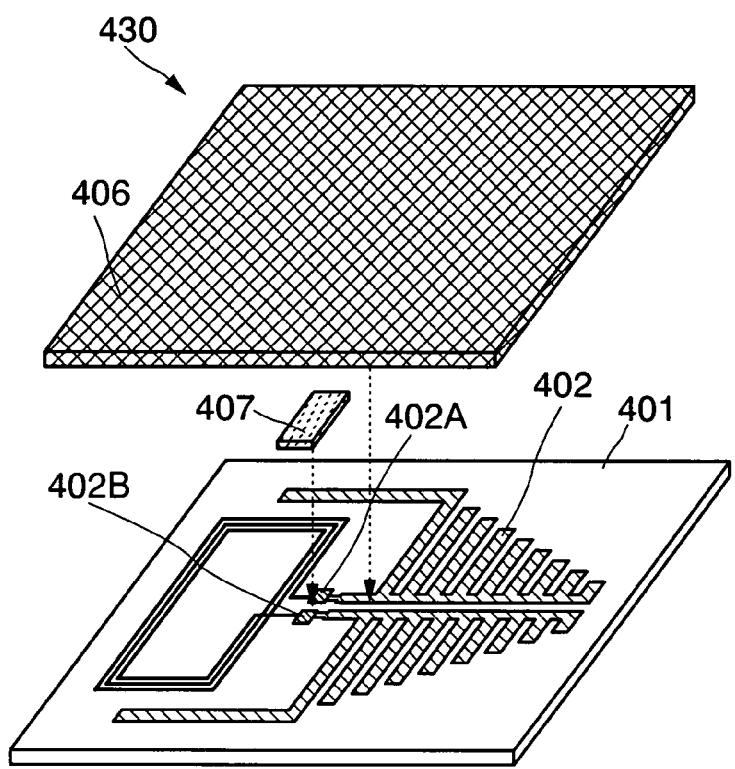
FIG. 10 is an exploded-view perspective diagram illustrating an example of a structure of an inlay.

Using FIG. 10, an example of an inlay with a different structure will be described. FIG. 10 is an exploded-view perspective diagram of an inlay 430. The inlay 430 is a variation of the inlay 410. To the substrate 401 over which the antenna circuit 402 is provided, an integrated circuit 407 and the storage means 406, each manufactured as a separate component, are affixed. The integrated circuit 407 is a component of a plurality of integrated circuits that were divided up into individual elements, and, for example, a bare chip can be used. The integrated circuit 407 and the antenna circuit 402 are connected to each other by solder, a conductive adhesive, or the like. The integrated circuit 407 and the storage means 406 are connected to each other by solder, a conductive adhesive, or the like.

It is to be noted that, in FIG. 10, an example was shown in which the integrated circuit 407 is affixed to the substrate 401 on the side on which the antenna circuit 402 is formed, but the integrated circuit 407 can be affixed to the substrate 401 on the opposite side, as well. For this case, for connecting the integrated circuit 407 to the antenna circuit 402, an opening may be formed in the substrate 401. In addition, in FIG. 10, an example was shown in which the storage means 406 is affixed to the substrate 401 on the side on which the integrated circuit 407 is formed, but the storage means 406 can be affixed to the substrate 401 on the side opposite the side on which the integrated circuit 407 is formed, as well. For this case, for connecting the storage means 406 to the integrated circuit 407, an opening may be formed in the substrate 401.

In the inlays, shown in FIG. 7, FIG. 8, FIG. 9, and FIG. 10, related to the present invention, deterioration of a battery over time as well as a shortage of electric power used for transmission and reception of information for individual objects which is the conventional problem, can be prevented by provision of a storage means that can be charged up by wireless signals, as in the conventional way. In particular, because the antenna circuit can receive signals from a wide band of frequencies, generally, electric power for driving an integrated circuit can be constantly stored in the storage means. Consequently, even if the received signals are weak, wireless communication can be performed stably because electric power can be supplied to the integrated circuit from the storage means.

Embodiment Mode 4

In the present embodiment mode, an example of a manufacturing method of an inlay will be described. In the present embodiment mode, a manufacturing method of the inlay 420 shown in FIG. 9 is given. In addition, in the present embodiment mode, a method will be described in which the integrated circuit 404 and the antenna circuit 402 are manufactured over the same substrate, and after these circuits 402 and 404 are manufactured, these circuits 402 and 404 are separated from the substrate used in manufacturing and transposed to a different substrate. Furthermore, in the present embodiment mode, an example is shown in which transistors forming the integrated circuit 404 are thin film transistors. Hereinafter, the manufacturing method will be described using the cross-sectional view diagrams FIGS. 11A to 11D, FIGS. 12A to 12C, FIGS. 13A and 13B, and FIGS. 14A and 14B.

First, as shown in FIG. 11A, an insulating film 602 is formed over one surface of a substrate 601, a peeling layer 603 is formed over the insulating film 602, and an insulating film 604 that functions as a base film is formed over the peeling layer 603. Over the insulating film 604, in order to form a semiconductor element, an amorphous semiconductor film 605 (for example, an amorphous silicon film) is formed. In FIG. 11A, the peeling layer 603 is formed over the entire surface of the substrate 601 with the insulating film 602 interposed between the peeling layer 603 and the substrate 601, but, if the need arises, the peeling layer 603 may be formed as selected by using a photolithography method after it is formed over the entire surface of the substrate 601. Furthermore, the insulating film 602, the peeling layer 603, the insulating film 604, and the amorphous semiconductor film 605 can be formed without any exposure of the substrate 601 to the atmosphere.

The substrate 601 is a substrate selected from a glass substrate, a quartz substrate, a ceramic substrate, a metal substrate (for example, a stainless steel substrate or the like), a semiconductor substrate such as a silicon wafer or the like, or the like. In addition, if such a substrate can withstand the heating temperature of the manufacturing process, a plastic substrate of polyethylene terephthalate (PET), polyethylene naphthalate (PEN), polyethyl sulfone (PES), acrylic, or the like can be used for the substrate 601.

The insulating film 602 and the insulating film 604 are formed using an insulating material such as silicon oxide, silicon nitride, silicon oxynitride ($SiO_xN_y$, x>y>0), silicon nitride oxide ($SiN_xO_y$, x>y>0), or the like using a CVD method, a sputtering method, or the like. For example, when the insulating films 602 and 604 are each formed as a two-layer structure, a silicon oxynitride film may be formed for an insulating film to be used as the first layer and a silicon nitride oxide film whose nitrogen content is higher than that of the first layer may be formed for an insulating film to be used as the second layer. Alternatively, a silicon nitride film may be formed for an insulating film to be used as the first layer and a silicon oxide film may be formed for an insulating film to be used as the second layer. The insulating film 602 is formed to prevent the peeling layer 603 from separating from the substrate 601 while an element formation layer is being formed. Moreover, the insulating film 604 is a protective layer that protects the element formation layer after the element formation layer is separated from the substrate 601 and is also a blocking layer that prevents penetration of an alkali metal such as sodium, an alkali-earth metal, or moisture from external.

For the peeling layer 603, a single-layer film of a metal or an alloy or a stacked-layer film of a metal film or an alloy film and a metal oxide film, a metal film or an alloy film and a metal oxynitride film, a metal film or an alloy film and a metal nitride oxide film, or a metal film or an alloy film and a metal nitride film is used. The metal element of the metal or the metal in the metal alloy can be selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir). In addition, these materials can be formed using a sputtering method, various kinds of CVD methods such as a plasma CVD method or the like, or the like.

An example of a method in which a stacked-layer film of a metal film (or an alloy film) and a metal oxide film is formed is presented. After the aforementioned metal film (or alloy film) is formed, an oxide of the metal element film is formed on the surface of the metal film (or metal alloy film) by performance of heat treatment on the metal film (or metal alloy film) in an oxygen atmosphere. In addition, when a metal oxynitride film or a metal nitride oxide film is formed instead of the metal oxide film, the atmosphere for heat treatment may be set to be a nitrogen oxide such as $N_2O$ or the like, and when a metal nitride is formed instead of the metal oxide film, the atmosphere for heat treatment may be set to be a nitrogen atmosphere.

Furthermore, by performance of plasma treatment instead of heat treatment, a metal oxide, a metal oxynitride, a metal nitride oxide, or a metal nitride can be formed on the surface of the metal film (or metal alloy film). For example, when a tungsten film is formed for the metal film by a sputtering method, a CVD method, or the like, by performance of oxygen plasma treatment on the tungsten film, a metal oxide film of tungsten oxide can be formed on the surface of the tungsten film.

In this case, the tungsten oxide is represented by WOx, where x is a value greater than or equal to 2 and less than or equal to 3. There are cases where x is 2 ($W_2O$), x is 2.5 ($W_2O_5$), x is 2.75 ($W_4O_{11}$), x is 3 ($WO_3$), and so on. In forming the tungsten oxide, there are no particular restrictions on the value of the aforementioned x, and which oxide is to be formed may be decided based on the etch rate or the like.

In addition, when a metal oxynitride film or a metal nitride oxide film is formed by plasma treatment instead of the metal oxide film, the atmosphere for the plasma treatment may be set to be an atmosphere that contains oxygen and nitrogen, and when a metal nitride is formed instead of the metal oxide film, the atmosphere for plasma treatment may be set to be a nitrogen atmosphere. Furthermore, using plasma treatment with a high density plasma is preferable for the plasma treatment.

For other methods of forming the stacked-layer film of the metal film (or alloy film) and the metal oxide film, for example, there is a method in which, after a metal film (for example, a metal film of tungsten) is formed, an insulating film that contains an oxide such as silicon oxide ($SiO_2$) or the like is formed over the metal film by a sputtering method. By the insulating film that contains an oxide, a metal oxide is formed in the interface between the metal film and the insulating film. In forming a metal nitride instead of the metal oxide, an insulating film that contains a nitride (for example, silicon nitride) is formed; in forming a metal oxynitride instead of the metal oxide, an insulating film that contains an oxynitride (for example, silicon oxynitride) is formed; in forming a metal nitride oxide instead of the metal oxide, an insulating film that contains a nitride oxide (for example, silicon nitride oxide) is formed.

The amorphous semiconductor film 605 is formed at a thickness of from 25 nm to 200 nm (preferably, from 30 nm to 150 nm) by a sputtering method, an LPCVD method, a plasma CVD method, or the like. Next, the amorphous semiconductor film 605 is crystallized, whereby a crystalline semiconductor film is formed. For a crystallization method, a laser crystallization method of irradiation with a laser beam, a thermal crystallization method using RTA or an annealing furnace, or the like can be applied. As shown in FIG. 11B, the crystalline semiconductor film is etched into a predetermined shape, whereby semiconductor films 605a to 605f are formed. An insulating film 606 is formed so as to cover the semiconductor films 605a to 605f. The insulating film 606 is a film that functions as a gate insulating film of a transistor.

For an example for when amorphous silicon is formed as the amorphous semiconductor film 605, steps for manufacturing the semiconductor films 605a to 605f will be described briefly. At first, an amorphous silicon film is formed using a plasma CVD method at a film thickness of from 50 nm to 60 nm. Next, a solution that contains nickel, which is a metal element that promotes crystallization of silicon, is applied to the amorphous silicon film so that nickel is introduced into the silicon film. After heat treatment is performed on the amorphous silicon film at 500° C. for 1 hour and hydrogen within the film is reduced, heat treatment is performed on the amorphous silicon film at 550° C. for 4 hours so that the amorphous silicon film is crystallized by thermal crystallization and a crystalline silicon film is formed. The crystalline silicon film is irradiated with a laser beam so that the crystallinity of the crystalline silicon film is improved. Next, a resist mask that has a predetermined shape is formed by a photolithography method, etching is performed using this resist mask as a mask, whereby the semiconductor films 605a to 605f that each have a predetermined shape are formed. It is to be noted that crystallization of the amorphous silicon film may be performed by irradiation with a laser beam only, without performance of thermal crystallization using a metal element that promotes crystallization of silicon.

The insulating film 606 is formed of an insulating material such as silicon oxide, silicon nitride, silicon oxynitride ($SiO_xN_y$, x>y>0), silicon nitride oxide ($SiN_xO_y$, x>y>0), or the like as a single-layer film or as a stacked-layer film. These insulating layers can be formed using a CVD method, a sputtering method, or the like. For example, when the insulating film 606 is formed as a two-layer structure, a silicon oxynitride film may be formed for an insulating film to be used as the first layer and a silicon nitride oxide film whose nitrogen content is higher than that of the first layer may be formed for an insulating film to be used as the second layer. Alternatively, a silicon oxide film may be formed for an insulating film to be used as the first layer and a silicon nitride film may be formed for an insulating film to be used as the second layer.

Furthermore, the insulating film 606 can be formed by oxidization or nitridation of a surface of each of the semiconductor films 605a to 605f by performance of plasma treatment using a high density plasma. In the plasma treatment using a high density plasma, a plasma is excited in a compound gas atmosphere of a noble gas such as He, Ar, Kr, Xe, or the like and oxygen, nitrogen oxide ($NO_2$), ammonia, nitrogen, hydrogen, or the like. If excitation of the plasma is performed using microwaves, a plasma with a low electron temperature and a high density can be generated. By oxygen radicals (there are cases where OH radicals are also included) or nitrogen radicals (there are cases where NH radicals are also included) generated by the high density plasma, the surface of the semiconductor film can be oxidized or nitrided.

By treatment using a high density plasma, an insulating film with a thickness of from 1 nm to 20 nm, typically, from 5 nm to 10 nm, is formed on the surface of the semiconductor films 605a to 605f. Because the reaction in this case is a solid-phase reaction, the interface state density in the interface between the aforementioned insulating film and the semiconductor films 605a to 605f can be greatly lowered. Because this kind of plasma treatment using a high density plasma oxidizes (or nitrides) the semiconductor film (formed of crystalline silicon or polycrystalline silicon) directly, variations in the thickness of the formed insulating film can be greatly reduced. In addition, the crystal grain boundaries of the semiconductor films 605a to 605f are hard to oxidize. In other words, by solid-phase oxidation of the surface of the semiconductor film by plasma treatment using a high density plasma, there are no abnormal oxidation reactions in the crystal grain boundaries, uniformity of the thickness is increased, and the insulating films 605a to 605f can each be formed with a low interface state density.

For the insulating film 606, an insulating film formed only by plasma treatment using a high density plasma can be used. In addition, a stacked-layer film in which this insulating film and an insulating film of silicon oxide, silicon oxynitride, silicon nitride, or the like formed by a CVD method using plasma or thermal reactions can also be used. Whatever the case, because an interface comes to be formed between each of the insulating films 605a to 605f formed by the high density plasma and the channel formation region of a transistor, in each transistor formed in the element formation region, variations in the characteristics from element to element can be reduced.

Next, over the insulating film 606, a first conductive film and a second conductive film, each formed of a different conductive material, are formed and stacked. Here, the first conductive film is formed at a thickness of from 20 nm to 100 nm. The second conductive film is formed at a thickness of from 100 nm to 400 nm. The first conductive film and the second conductive film are formed of one or more elements selected from tantalum (Ta), tungsten (W), titanium (Ti), molybdenum (Mo), aluminum (Al), copper (Cu), chromium (Cr), niobium (Nb), and the like or of an alloy material or compound material that contains one or more of these elements as the main component or components. Alternatively, the first conductive film and the second conductive film may each be formed of a semiconductor material represented by polycrystalline silicon that has been doped with an impurity element such as phosphorus or the like.

In giving examples of combinations for the first conductive film and the second conductive film, a tantalum nitride film and a tungsten film, a tungsten nitride film and a tungsten film, a molybdenum nitride film and a molybdenum film, and the like can be given. For tungsten and tungsten nitride, because heat resistance is high, after the first conductive film and the second conductive film are formed, heat treatment whose object is heat activation can be performed. Alternatively, when a three-layer, not a two-layer, structure is used, a stacked-layer structure of a molybdenum film, an aluminum film, and a molybdenum film may be employed.

A mask formed of a resist is formed using a photolithography method, and the first conductive film and the second conductive film are etched using this mask, whereby a gate electrode and gate wiring are formed. In FIG. 11C, only gate electrodes 607 are shown formed over the semiconductor films 605a to 605f. Each of the gate electrodes 607 is formed as a stacked-layer structure of a first conductive film 607a and a second conductive film 607b.

Using the gate electrodes 607 as a mask, by an ion doping method or an ion injection method, an impurity element imparting n-type conductivity is added to the semiconductor films 605a to 605f. Next, a mask formed of a resist is formed by a photolithography method, and, using the gate electrodes 607 as a mask, an impurity element imparting p-type conductivity is added to some of the semiconductor films (to the semiconductor films 605c and 605e). For an impurity element exhibiting n-type conductivity, phosphorus (P), arsenic (As), or the like can be used. For an impurity element exhibiting p-type conductivity, boron (B), aluminum (Al), gallium (Ga), or the like can be used. Here, for an impurity element imparting n-type conductivity, phosphorus (P) is used and selectively introduced into the semiconductor films 605a to 605f so that the semiconductor films 605a to 605f each contain phosphorus (P) at a low concentration of from $1\times10^{15}/cm^3$ to $1\times10^{19}/cm^3$, and low concentration impurity regions 608 exhibiting n-type conductivity are formed. Furthermore, for an impurity element imparting p-type conductivity, boron (B) is used and selectively introduced into the semiconductor films 605c and 605e so that the semiconductor films 605c and 605e each contain boron (B) at a concentration of from $1\times10^{19}/cm^3$ to $1\times10^{20}/cm^3$, and high concentration impurity regions 609 exhibiting p-type conductivity are formed (refer to FIG. 11C).

An insulating film is formed so as to cover the insulating film 606 and the gate electrodes 607. The insulating film is formed as a single-layer film or a stacked-layer film selected from films that contain an inorganic material of a silicon oxide or a silicon nitride and films that contain an organic material such as an organic resin or the like. This insulating film is etched by anisotropic etching, and insulating films 610 (also referred to as sidewalls) are formed in contact with side surfaces of each of the gate electrodes 607. The insulating films 610 are used as masks for doping when LDD (lightly doped drain) regions are formed. At this time, the insulating film 606 is etched, as well, and sections of the insulating film 606 layered with the first conductive film 607a and the second conductive film 607b and sections of the insulating film 606 layered with the insulating films 610 are left remaining.

The mask formed from a resist that was formed by a photolithography method, the gate electrodes 607, and the insulating film 610 are used as masks, and an impurity element imparting n-type conductivity is added to each of the semiconductor films 605a, 605b, 605d, and 605f at a high concentration. Here, for the impurity element imparting n-type conductivity, phosphorus (P) is used and selectively introduced into the semiconductor films 605a, 605b, 605d, and 605f so that the semiconductor films 605a, 605b, 605d, and 605f each contain phosphorus (P) at a concentration of from $1\times10^{19}/cm^3$ to $1\times10^{20}/cm^3$, whereby n-type high concentration impurity regions 611 that each contain a higher concentration of the n-type impurity element than the low concentration impurity regions 608 are formed.

As shown in FIG. 11D, by the above steps, channel formation regions and impurity regions are formed for each of the semiconductor films 605a to 605f. The semiconductor films 605a, 605b, 605d, and 605f form n-channel thin film transistors 600a, 600b, 600d, and 600f. The semiconductor films 605c and 605e form p-channel thin film transistors 600c and 600e.

In the n-channel thin film transistor 600a, a channel formation region is formed in a region where the gate electrode 607 and the semiconductor film 605a overlap; high concentration impurity regions 611 each forming a source region or drain region are formed in regions where the gate electrode 607 and the semiconductor film 605a do not overlap; and low concentration impurity regions 608 (LDD regions) are formed between the channel formation region and the high concentration impurity regions 611, in regions that overlap with the insulating film 610. Furthermore, the channel formation regions, the low concentration impurity regions 608, and the high concentration impurity regions 611 are formed in the n-channel thin film transistors 600b, 600d, and 600f in the same way.

In the p-channel thin film transistor 600c, a channel formation region is formed in a region where the gate electrode 607 and the semiconductor film 605c overlap, and high concentration impurity regions 609 each forming a source region or drain region are formed in regions where the gate electrode 607 and the semiconductor film 605c do not overlap. Furthermore, the channel formation region and the high concentration impurity regions 609 are formed in the p-channel thin film transistor 600e in the same way. It is to be noted that, here, LDD regions are not formed in the p-channel thin film transistors 600c and 600e, but LDD regions may be formed in the p-channel thin film transistors, as well. Moreover, the structure of the n-channel thin film transistors may be one in which LDD regions are not formed, as well.

An insulating film of a single-layer structure or stacked-layer structure is formed so as to cover the semiconductor films 605a to 605f, the gate electrodes 607, and the like. Here, as shown in FIG. 12A, the insulating film is formed as two layers where, for an insulating film 612a used as the first layer, a silicon nitride oxide film whose nitrogen content is higher than that of the second layer is formed, and, for an insulating film 612b used as the second layer, a silicon oxynitride film is formed. After a contact hole is formed at a predetermined location in the insulating films 612a and 612b, a conductive film is formed over the insulating film 612b and processed into a predetermined shape, and a conductive film 613, which is electrically connected to each of the high concentration impurity regions 609 and 611 that each form a source region or drain region of the thin film transistors 600a to 600f, is formed.

Either before or after the insulating films 612a and 612b are formed or after the insulating film 612a is formed, heat treatment may be performed with the object of restoring the crystallinity of the semiconductor films 605a to 605f, activating the impurity elements that were added to the semiconductor films 605a to 605f, and hydrogenizing the semiconductor films 605a to 605f. It is to be noted that when the object is hydrogenization, because hydrogen is supplied to the insulating film 612a that is used as the first layer, heat treatment is performed after at least the insulating film 612a is formed.

For the heat treatment, thermal annealing, a laser annealing method, an RTA method, or the like is used.

The conductive film 613 is formed by a CVD method, a sputtering method, or the like as a single-layer film or a stacked-layer film of one or more metal elements selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), or the like or of an alloy material or compound material that contains one or more of these metal elements as the main component or components. For example, for an alloy material where aluminum is the main component, there is a material that contains aluminum as the main component and nickel or a material that contains aluminum as the main component, nickel, and either one or both of carbon and silicon.

For example, for the conductive film 613, a stacked-layer structure of a barrier film, an aluminum-silicon (Al—Si) film, and a barrier film or a stacked-layer structure of a barrier film, an aluminum-silicon (Al—Si) film, a titanium nitride film, and a barrier film may be employed. For the barrier film, a thin film formed of titanium, a nitride of titanium, molybdenum, or a nitride of molybdenum may be employed. Because aluminum and aluminum silicon have low resistance and are inexpensive, they are the most suitable for materials forming the conductive film 613, but they have low resistance to heat. As a result, if barrier layers of an alloy that contains aluminum as the main component are provided as a top layer and a bottom layer, the formation of hillocks can be prevented. Furthermore, when the barrier film is formed of titanium, which is highly reducible, even if a thin, naturally oxidized film is formed over the semiconductor films 605a to 605f, this naturally oxidized film can be reduced and good contact with the semiconductor films 605a to 605f can be made.

As shown in FIG. 12B, an insulating film 614 is formed so as to cover the conductive film 613. The insulating film 614 can be formed as a single layer or as a stacked-layer structure of an insulating film that contains an oxide or nitride such as silicon oxide ($SiO_x$), silicon nitride ($SiN_x$), silicon oxynitride ($SiO_xN_y$, x>y>0), silicon nitride oxide ($SiN_xO_y$, x>y>0), or the like; a film that contains carbon such as DLC (diamond-like carbon) or the like; an organic material such as an epoxy, a polyimide, a polyamide, polyvinyl phenol, benzocyclobutene, acrylic, or the like; or a siloxane material such as a siloxane resin or the like, by a CVD method, a sputtering method, or the like. It is to be noted that the siloxane material corresponds to a material that contains Si—O—Si bonds. Siloxane is formed of a skeleton structure of silicon (Si) and oxygen (O) bonds. For a substituent group, an organic group that contains at least hydrogen (for example, an alkyl group or an aromatic hydrocarbon) is given. For a substituent group, a fluoro group is given, as well. Furthermore, for a substituent group, an organic group that contains at least hydrogen and a fluoro group are given.

A contact hole is formed in the insulating film 614 in a predetermined location. A conductive film is formed over the insulating film 614, this conductive film is processed into a predetermined shape to form a conductive film 615a electrically connected to the conductive film 613 that forms a source electrode or drain electrode of the thin film transistor 600a, a conductive film 615b electrically connected to the conductive film 613 that forms a source electrode or drain electrode of each of the thin film transistor 600f, and a conductive film 616 electrically connected to the conductive film 613 that forms a source electrode or drain electrode of the thin film transistor 600b. The conductive films 615a and 615b and the conductive film 616 can each be formed as a single-layer film or a stacked-layer film that uses a material selected from the conductive materials that can be used to form the conductive film 613.

As shown in FIG. 12B, the conductive film 617 that forms an antenna circuit is formed. The conductive film 617 is formed so as to be electrically connected to the conductive film 616. A conductive film 631a and a conductive film 631b electrically connected to the conductive film 615a and the conductive film 615b, respectively, are also formed at the same time as the conductive film 617 is formed. The conductive films 631a and 631b are wirings connected to a storage means.

The conductive film 617 and the conductive films 631a and 631b are formed of a conductive material using a CVD method; a sputtering method; a printing method such as a screen printing method, a gravure printing method, or the like; a droplet discharge method; a dispenser method; a plating method; or the like. By these methods, the conductive film 617 that is processed into a predetermined shape can be formed without performance of a photolithography step or an etching step. The conductive material can be deposited to form a single-layer structure or a stacked-layer structure using an element or elements selected from aluminum (Al), titanium (Ti), silver (Ag), copper (Cu), gold (Au), platinum (Pt), nickel (Ni), palladium (Pd), tantalum (Ta), and molybdenum (Mo) or of an alloy material or compound material that contains one or more of these metal elements as the main component or components.

For example, when the conductive film 617 and the conductive films 631a and 631b are formed, the conductive film 617 and the conductive films 631a and 631b can be formed by selective printing of a conductive paste in which conductive particles with a grain size of from several nanometers to several tens of micrometers are dissolved or dispersed throughout an organic resin. For the conductive particles, fine particles or dispersible nanoparticles of metal particles of any one or more of silver (Ag), gold (Au), copper (Cu), nickel (Ni), platinum (Pt), palladium (Pd), tantalum (Ta), molybdenum (Mo), titanium (Ti), and the like or of a silver halide can be used. In addition, for the organic resin contained in the conductive paste, one or more selected from organic resins that function as a binder, a solvent, a dispersant, or a coating material of a metal particle, can be used. Typically, an organic resin such as an epoxy resin, a silicone resin, and the like can be given.

Moreover, the conductive film 617 and the conductive films 631a and 631b can be formed by baking of the conductive paste. For example, for the conductive paste, when fine particles (for example, fine particles with a grain diameter of greater than or equal to 1 nm and less than or equal to 100 nm) that contain silver as the main component are used, by baking at a temperature within the temperature range of from 150° C. to 300° C., a hardened conductive film can be obtained. Furthermore, fine particles that contain solder or lead-free solder as the main component may be used, and, in this case, using fine particles with a grain diameter of 20 μm or less is preferable. Solder and lead-free solder have an advantage in that they are both low cost.

By the above steps, the antenna circuit 402 and the integrated circuit 404 can be formed over the substrate 601. Next, a step in which these circuits 402 and 404 are separated from the substrate 601 and transposed to another substrate will be described. It is to be noted that a layer that contains the thin film transistors 600a to 600f, the conductive film 617, and the like will be hereinafter referred to as an "element formation layer 619." That is, the element formation layer 619 is a layer that includes the antenna circuit 402 and the integrated circuit 404.

Next, as shown in FIG. 12C, an insulating film 618 is formed so as to cover the conductive film 617 and the conductive films 631a and 631b. Openings 618a and 618b reaching the conductive films 631a and 631b are formed in the insulating film 618. The insulating film 618 can be formed as a single layer or as a stacked layer structure of an organic insulating film that contains an oxide or nitride such as silicon oxide ($SiO_x$), silicon nitride ($SiN_x$), silicon oxynitride ($SiO_xN_y$, x>y>0), silicon nitride oxide ($SiN_xO_y$, x>y>0), or the like; a film that contains carbon such as DLC (diamond-like carbon) or the like; an organic material such as an epoxy, a polyimide, a polyamide, polyvinyl phenol, benzocyclobutene, acrylic, or the like; or a siloxane material such as a siloxane resin or the like, by a CVD method, a sputtering method, or the like. For example, by formation of the insulating film 618 by a photosensitive resin material, a film of the resin material in which the openings 618a and 618b are provided can be formed without performance of a photolithography step or an etching step.

As shown in FIG. 12C, openings 620 are formed in the insulating film 618. The openings 620 are formed by removal of stacked insulating films in the element formation layer 619 by irradiation with a laser beam. Each of the openings 620 is formed in a region away from the thin film transistors 600a to 600f (the integrated circuit 404).

Figure 13A:
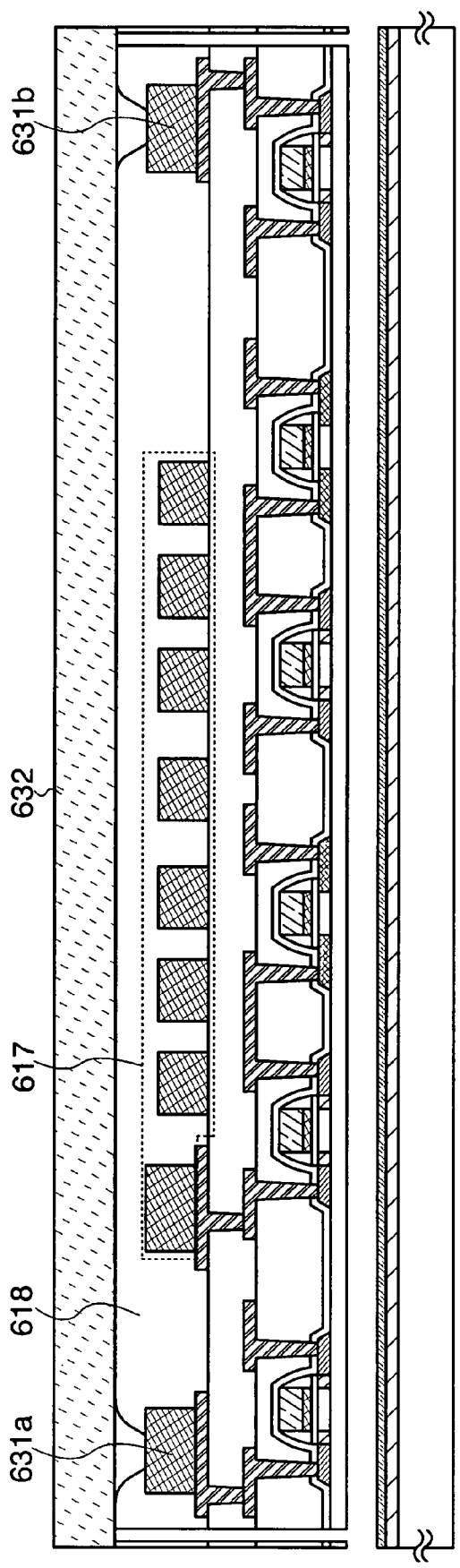
FIGS. 13A and 13B are cross-sectional view diagrams used to describe manufacturing steps for an inlay.

As shown in FIG. 13A, after the openings 620 are formed, a sheet material 632 is attached to one surface (the exposed surface of the insulating film 618) of the element formation layer 619. Through the sheet material 632, physical force is exerted on the peeling layer 603, and the element formation layer 619 is separated from the substrate 601. The sheet material 632 is a substrate used to support the element formation layer 619 when it is separated from the substrate 601, and because it will ultimately be removed, an object with low adhesion is used.

It is to be noted that before attachment of the sheet material 632, an etching agent is introduced into each of the openings 620, and, by partial removal of the peeling layer 603, the substrate 601 may be made to be peeled off easily. For the etching agent, a gas or liquid that contains a halogen fluoride or an interhalogen compound is used. For example, for a gas that contains a halogen fluoride, chlorine trifluoride ($ClF_3$) is used.

Figure 13B:
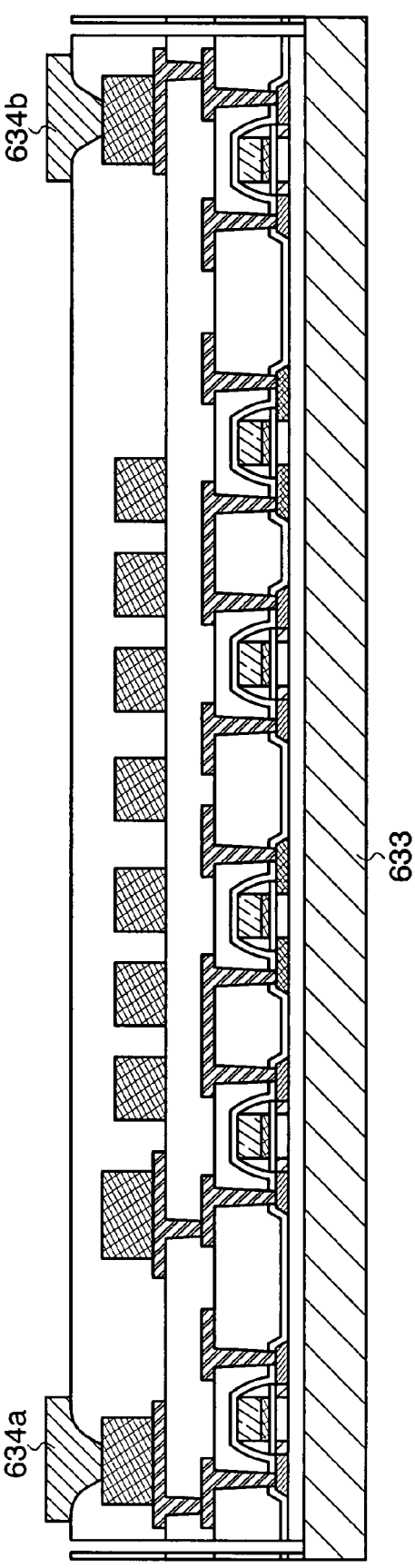

After the substrate 601 is peeled off, as shown in FIG. 13B, a sheet material 633 is attached to another surface (the surface exposed by detachment) of the element formation layer 619. The sheet material 633 corresponds to the substrate 403 that is included in an inlay (refer to FIG. 9). After attachment of the sheet material 633, the sheet material 632 is removed from the element formation layer 619.

As shown in FIG. 13B, after the sheet material 632 is removed, conductive films 634a and 634b electrically connected to the conductive films 631a and 631b through the openings 618a and 618b are formed. The conductive films 634a and 634b are formed using a CVD method; a sputtering method; a printing method such as a screen printing method, a gravure printing method, or the like; a droplet discharge method; a dispenser method; a plating method; or the like. The conductive films 631a and 631b are each formed as a single-layer film or a stacked-layer film of a metal element or elements selected from aluminum (Al), titanium (Ti), silver (Ag), copper (Cu), gold (Au), platinum (Pt), nickel (Ni), palladium (Pd), tantalum (Ta), and molybdenum (Mo) or of an alloy material or a compound material that contains one or more of these metal elements as the main component or components. It is to be noted that detachment of the element formation layer 619 from the substrate 601 may be performed after the conductive films 634a and 634b are formed.

As shown in FIG. 14A, when a plurality of elements is formed over a substrate, the element formation layer 619 may be separated into individual elements. For separating elements of the element formation layer 619 into individual elements, a laser irradiation apparatus, a dicing machine, a scribing machine, or the like can be used.

As shown in FIG. 14B, on the top surface of the element formation layer 619 on the side opposite the sheet material 633, a planar battery 635 used for the storage means 406 is affixed. The battery 635 is electrically connected to the integrated circuit 404 in the element formation layer 619. For this reason, the conductive film 634a and conductive film 634b formed in the element formation layer 619 are connected to a connection terminal 635a and connection terminal 635b, respectively, of the battery 635. Here, the case where connection of the conductive film 634a and the connection terminal 635a and connection of the conductive film 634b and the connection terminal 635b are performed by an anisotropic conductive film (ACF) is presented. Reference numeral 637 indicates an ACF adhesive layer, and reference numeral 638 indicates conductive fine particles. In addition to an ACF, a conductive adhesive such as an anisotropic conductive paste (ACP), a silver paste, a copper paste, a carbon paste, or the like; a solder joint; or the like can be used, and electrical connection between the battery 635 and the integrated circuit 404 can be performed.

By the steps illustrated in FIGS. 11A to 11D, FIGS. 12A to 12C, FIGS. 13A and 13B, and FIGS. 14A and 14B above, an inlay that can be bent can be fabricated.

Embodiment Mode 5

In the present embodiment mode, examples of applications of semiconductor devices (an ID label, an ID tag, and an ID card) related to the present invention and products to which these semiconductor devices have been attached will be described with reference to FIGS. 15A to 15D and FIGS. 16A to 16D.

Figure 15A:
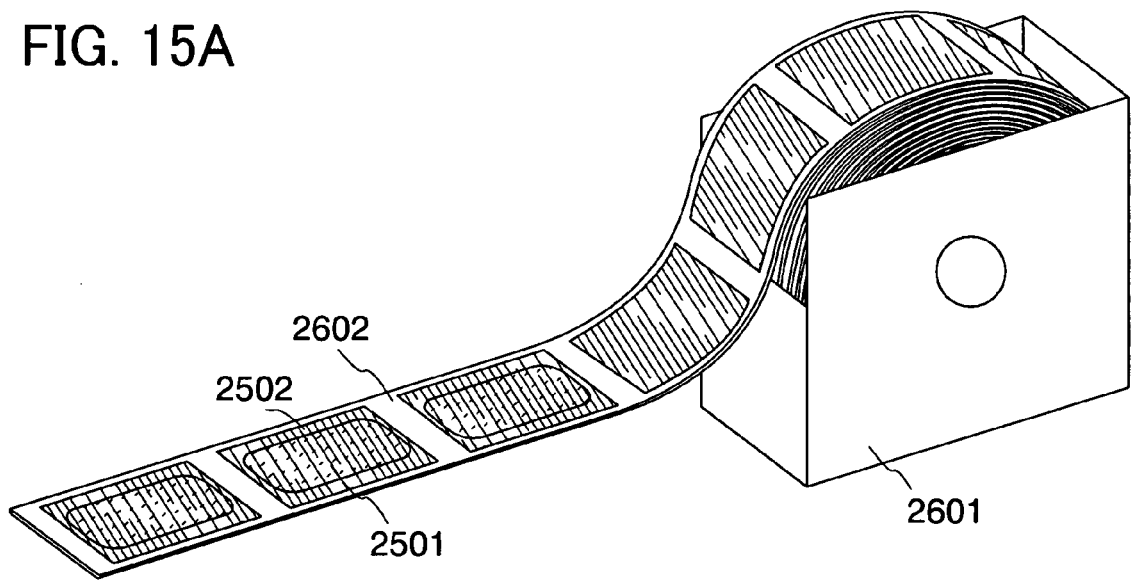
FIGS. 15A to 15D are diagrams each used to describe an example of an embodiment mode of a semiconductor device.

FIG. 15A is an example of the state of a finished product of an ID label related to the present invention. On label mounting 2602 (separate paper), a plurality of ID labels 2502, in each of which is embedded an inlay 2501 by which wireless communication can be performed, is formed. The ID labels 2502 are stored in a box 2601. In addition, on each of the ID labels 2502, information related to the product and services (product name, brand, trademark, proprietor of the trademark, distributor, manufacturer, and the like) is written, while, on the embedded ID chip, the product's unique ID number (or that of the class of goods) is printed, and illegal actions such as forgery; intellectual property rights infringement, such as infringement of trademark rights, patent rights, and the like; unfair competition; and the like can easily be controlled. Furthermore, a great amount of information, such as place of manufacture, place of sale, quality, materials used, benefits, intended uses, amount, shape, and price of a product; a production method; production time; use time; expiration date; instruction manual; intellectual property information of the product; and the like, that cannot be written on a product container or label can be input to the ID chip, and a trader or consumer can access this information by use of a simple reader. In addition, the structure is one in which rewriting of data, erasing of data, and the like can easily be done by the manufacturer but cannot be done by the trader or consumer.

Figure 15B:
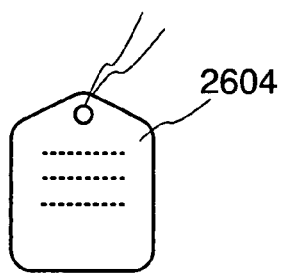

In FIG. 15B, an ID tag 2604 in which an inlay is embedded is shown. By provision of the ID tag 2604 in a product, product management becomes easier to perform. For example, if the product is stolen, the person who committed the crime can be caught quickly by tracking of the route of the product. In this way, by provision of an ID tag, a product whose so-called traceability is excellent can be marketed.

Figure 15C:
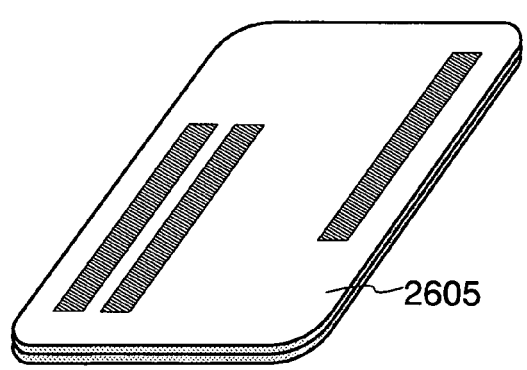

FIG. 15C is an example of the state of a finished product of an ID label related to the present invention. For the aforementioned ID card, every conceivable card type, such as cash cards, credit cards, prepaid cards, electronic tickets, electronic money, telephone cards, membership cards, and the like, are included.

Figure 15D:
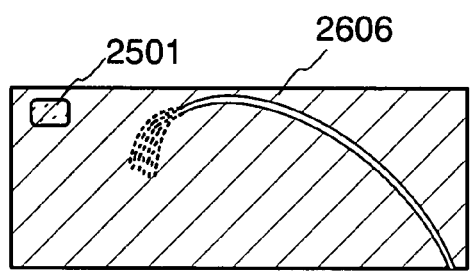

In FIG. 15D, the state of a finished product of a bearer bond 2606 to which the present invention is applied is shown. The inlay 2501 is embedded into the bearer bond 2606, the periphery thereof is molded by a resin, and a chip is protected. Here, the structure is one in which the resin is filled up with a filler. The bearer bond 2606 can be formed by the same process that is used to form the ID label, ID tag, and ID card related to the present invention. It is to be noted that for the kinds of bearer bonds, stamps; tickets such as tickets for travel, admission tickets, or the like; merchandise coupons; bookstore gift certificates; stationery gift certificates; beer coupons; rice coupons; various types of product gift certificates; gift certificates for services; and the like are included. However, of course, the present invention is not limited to these.

Figure 16A:
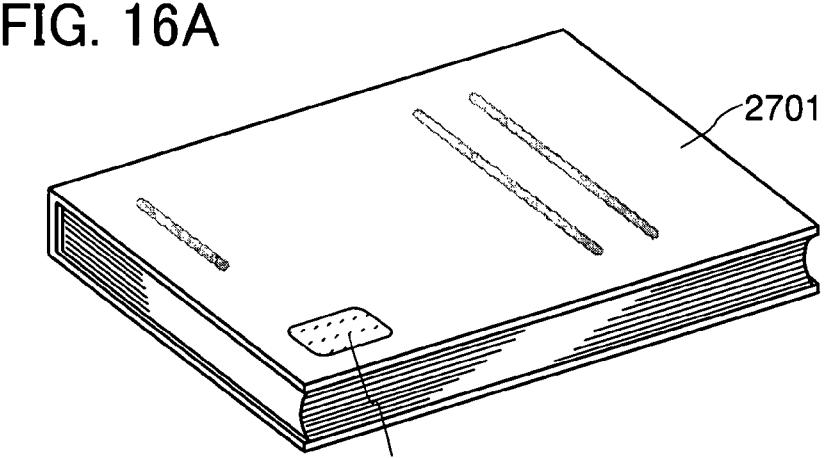
FIGS. 16A to 16D are diagrams each used to describe an example of an article to which an ID label or the like has been attached.
Figure 16B:
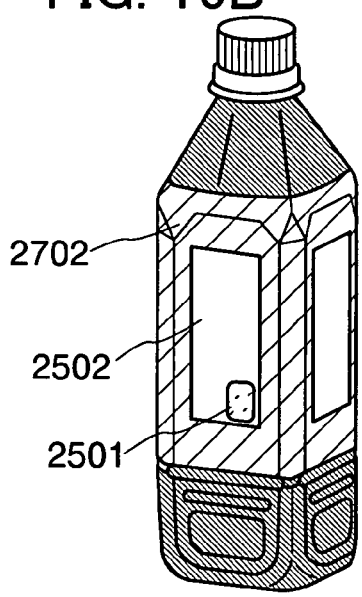

In FIGS. 16A and 16B, a book 2701 and a plastic bottle 2702 to each of which the ID label 2502 related to the present invention is attached are illustrated. Because an ID label used in the present invention is extremely thin, even if the ID label is mounted to an article such as a book or the like, functions and design characteristics of the article are not affected. Furthermore, for a contactless thin film integrated circuit device, an antenna can be formed as part of the integrated circuit over the same substrate thereof, and the contactless thin film integrated circuit device can easily be transferred directly to a curved surface of an article.

Figure 16C:
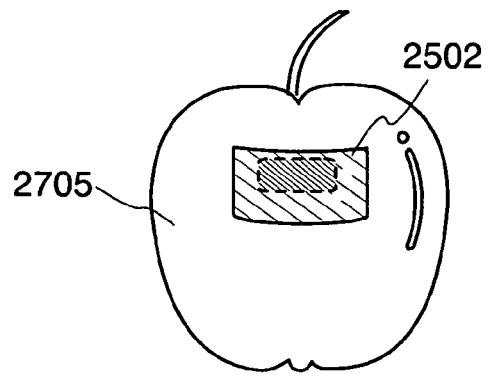
Figure 16D:
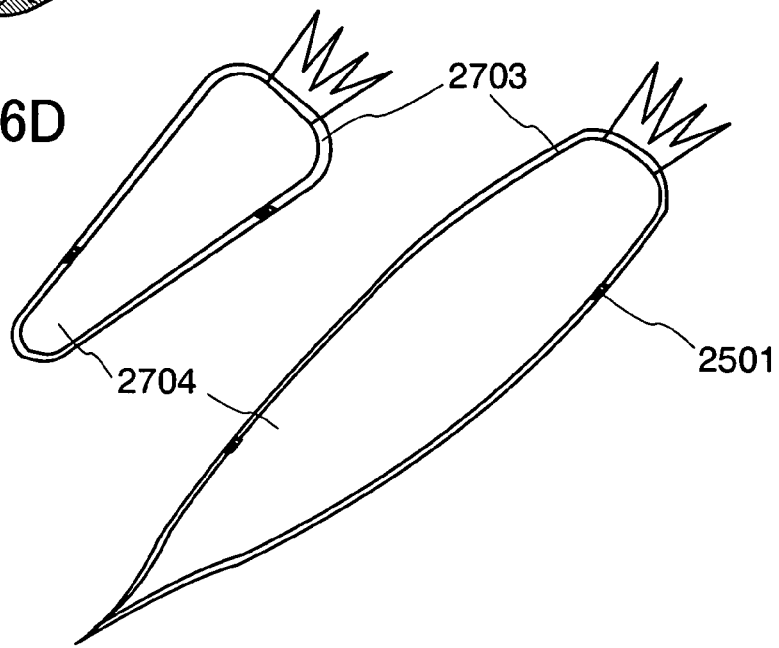

In FIG. 16C, a state in which the ID label 2502 is directly attached to a fruit 2705 of fresh produce is illustrated. In addition, in FIG. 16D, an example is shown in which a vegetable 2704 of fresh produce is wrapped in a type of wrapping film. Moreover, it is to be noted that when the inlay 2501 is attached to an article, there is a possibility that the inlay 2501 will be separated from the article; however, when the article is wrapped in a type of wrapping film, because it is difficult to separate a wrapping film 2703 from the article, there are some merits related to crime prevention. It is to be noted that a chip related to the present invention can be used in all kinds of articles other than those listed above.

Embodiment Mode 6

In the present embodiment mode, with reference to FIGS. 17A and 17B, FIG. 18, and FIG. 19, a product management method and the flow of information or goods of an article in which a semiconductor device (an ID label or an ID tag) related to the present invention is mounted will be described.

First, with reference to FIG. 17A, a case in which a customer purchases an article in a store will be described. To an article 2801 that is displayed inside a store, the ID label 2502 or an ID tag to which information about product characteristics and information about production history or the like is stored is attached. If the customer holds the article 2801 up to a reader/writer 2802 for customer use that is provided in the store or that the customer possesses, communication between the reader/writer 2802 and the ID label 2502 or the like that is attached to the article is performed through the antenna portion 2803, whereby information stored in the ID label 2502 or the like can be read.

For the reading of information and selection of whether a purchase will be made or not, it is preferable that these be set so that the customer can freely perform them using operation keys 2805. Furthermore, it is set so that the read information is displayed on a display portion 2804 included in the reader/writer 2802 for customer use. For the information, price of an article, consumption tax, country of origin, producer, origin of import, production time, expiration date, intended use of the article (if it is a food product, recipes and the like), and the like can be given. Furthermore, setting the display so that the total amount of purchase for shopping is displayed is convenient.

Moreover, if the reader/writer 2802 for customer use is set to be connected to a POS system (a point-of-sales system) 2806, an operation for reading a barcode in order to read the amount of money as is performed at a conventional cash register becomes unnecessary. It is to be noted that the POS system is a system by which an ID label, an ID tag, or the like attached to the article is read by an automatic reader at the point of sale; the data is directly input to a computer; and sales management, customer management, inventory control, purchasing control, and the like are performed.

In addition, if a personal account 2807 such as an electronic money account or the like is set to be connected to the reader/writer 2802 for consumer use or the POS system 2806 and set up so that the purchase amount or usage amount is automatically withdrawn from the personal account 2807, the system will become cashless and cash register-less, and shopping and the like can be done more efficiently. Furthermore, by an electronic money card that an individual possesses, by communication between the electronic money card and the reader/writer 2802 for consumer use, paying the balance can be performed on site, as well. For an electronic money card, of course, the ID card related to the present invention can be employed. Moreover, by provision of a gate used for product management at an entryway of a shop, products not input to the reader/writer 2802 for consumer use or the POS system 2806 (that is, products that have not been purchased) can be checked, whereby theft can be prevented.

Furthermore, because the semiconductor device of the present invention includes a storage means that can be charged up wirelessly by electric power, there is no need to replace the battery, and even if signals received become weak, stable wireless communication can be performed. In addition, because electrical power can be automatically stored in the storage means if the received signals are strong, charging up of power can be performed even if the user does not intentionally perform a charging operation. Of course, if the electric power stored in the storage means is low enough, the user can intentionally perform charging easily. Consequently, by application of the semiconductor device of the present invention to the ID label 2502, a system managing the state of a product in which a sensor or memory device is installed is stored in memory can be operated stably. For this kind of system, for example, managing the temperature of refrigerated goods and the like can be given.

Figure 17A:
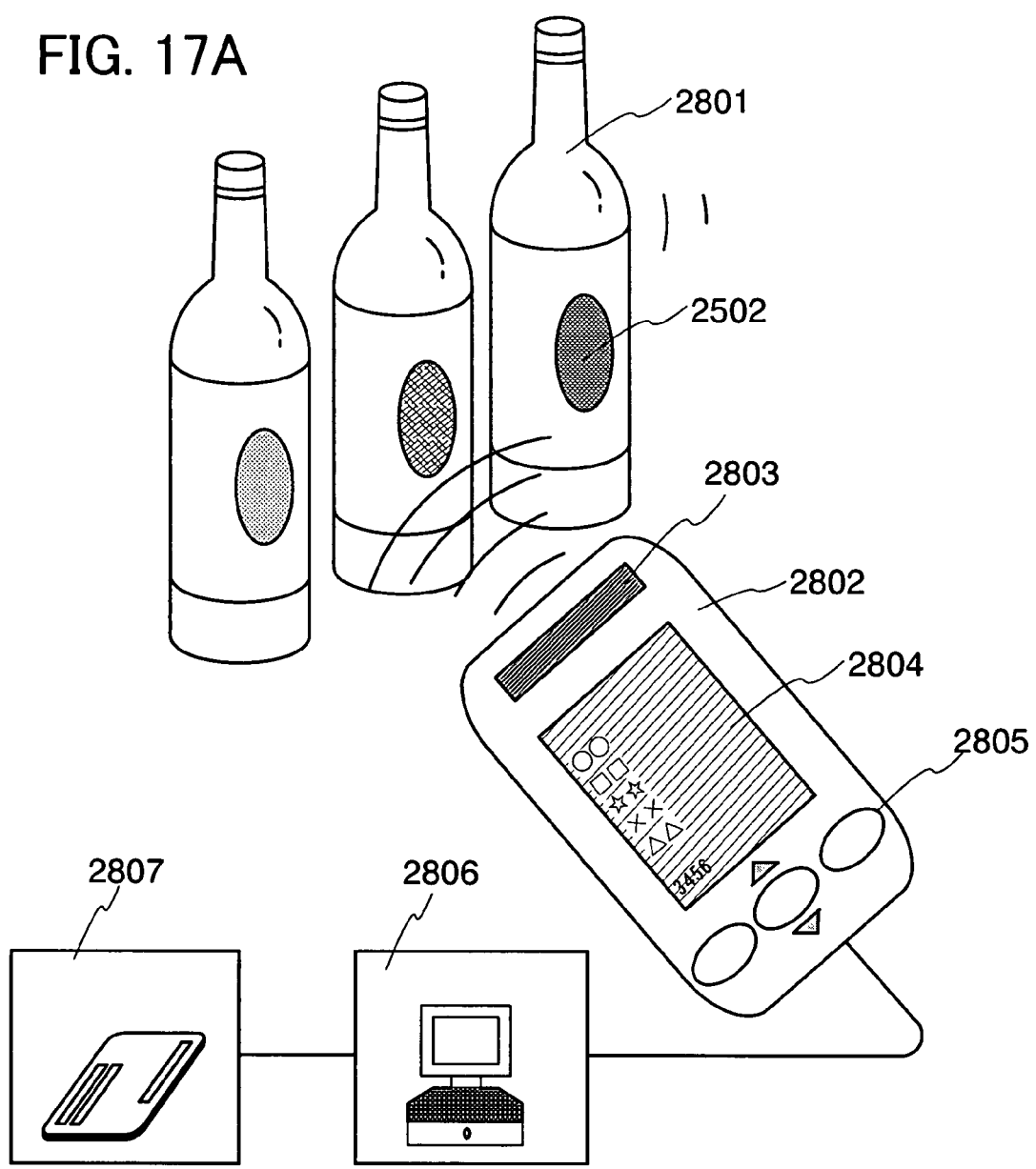
FIGS. 17A and 17B are diagrams each used to describe an example of merchandise being purchased in a store.
Figure 17B:
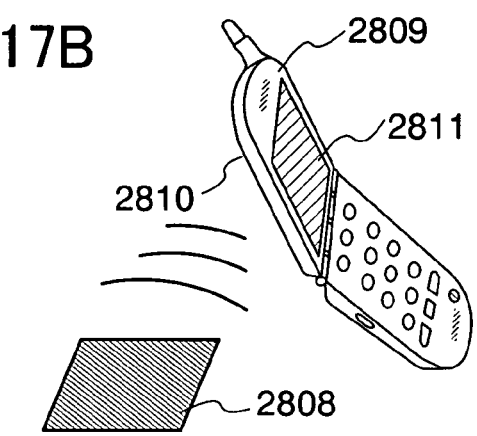

It is to be noted that the shape and functions of the reader/writer 2802 are not limited to those shown in FIG. 17A. For example, as shown in FIG. 17B, using a portable information terminal, possessed by an individual such as a cellular phone main body 2809, that is equipped with a reader/writer function, information of a product 2808 to which an ID label or an ID tag is mounted is made to be displayed on the display portion 2811 through a sensor portion 2810. In this way, compared to the amount of information provided by a conventional wireless tag or the like, a consumer can freely obtain access to a wealth of information related to a product.

Figure 18:
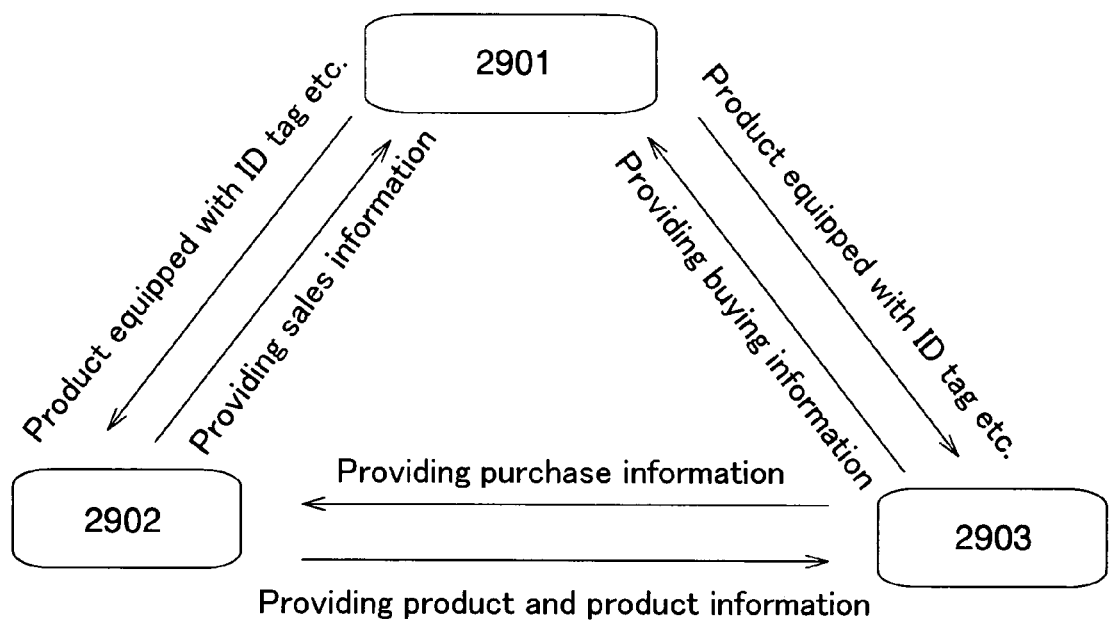
FIG. 18 is a diagram illustrating the relationship between a producer (manufacturer), a seller, and a consumer.

Here, the product flow of a product that is equipped with the semiconductor device related to the present invention that has a wireless communication function such as an ID label, an ID tag, or the like will be described briefly. In FIG. 18, a producer (manufacturer) 2901 provides, for example, a product equipped with an ID tag or the like to a seller 2902 (a retailer, a distributor, or the like) or a consumer 2903. Then, the seller 2902 can provide, for example, information about charges to the consumer 2903 when an account is settled and information about sales information such as the number of products sold, time of purchase, and the like to the producer 2901. Meanwhile, the consumer 2903 can provide purchase information such as personal information and the like. For example, purchase information can be provided to the seller 2902 or the producer 2901 through the Internet or the like by a personal reader or the like. In addition, by the semiconductor device that has a wireless communication function, the seller 2902 can provide product information to and obtain purchase information from the consumer 2903. This kind of sales information, purchase information, and the like is valuable information and will be useful for future marketing strategies.

For a means of providing various kinds of information, there is a method in which information read by a reader that the seller or consumer has from the semiconductor device that has a wireless communication function is disclosed to the producer, the seller, or the consumer via a computer or network. As described above, because information can be provided by wireless communication to a person who needs it, the ID label or ID tag related to the present invention is useful for commodity transactions and production management, as well. It is to be noted that the aforementioned system is one that can be applied to cases where products are circulated from a consumer to a secondhand goods distributor, as well.

Figure 19:
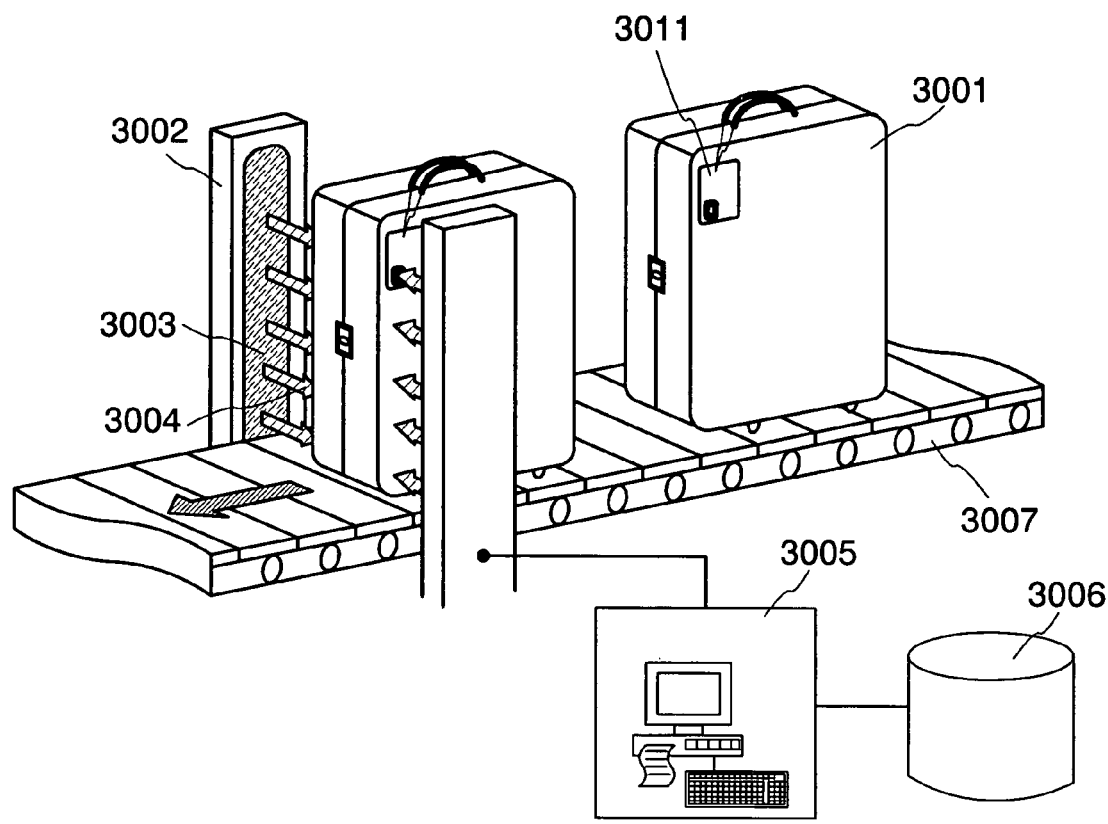
FIG. 19 is a diagram used to describe an inspection method for goods to which an ID tag is attached for inspection performed at times that luggage is inspected.
Figure 20:
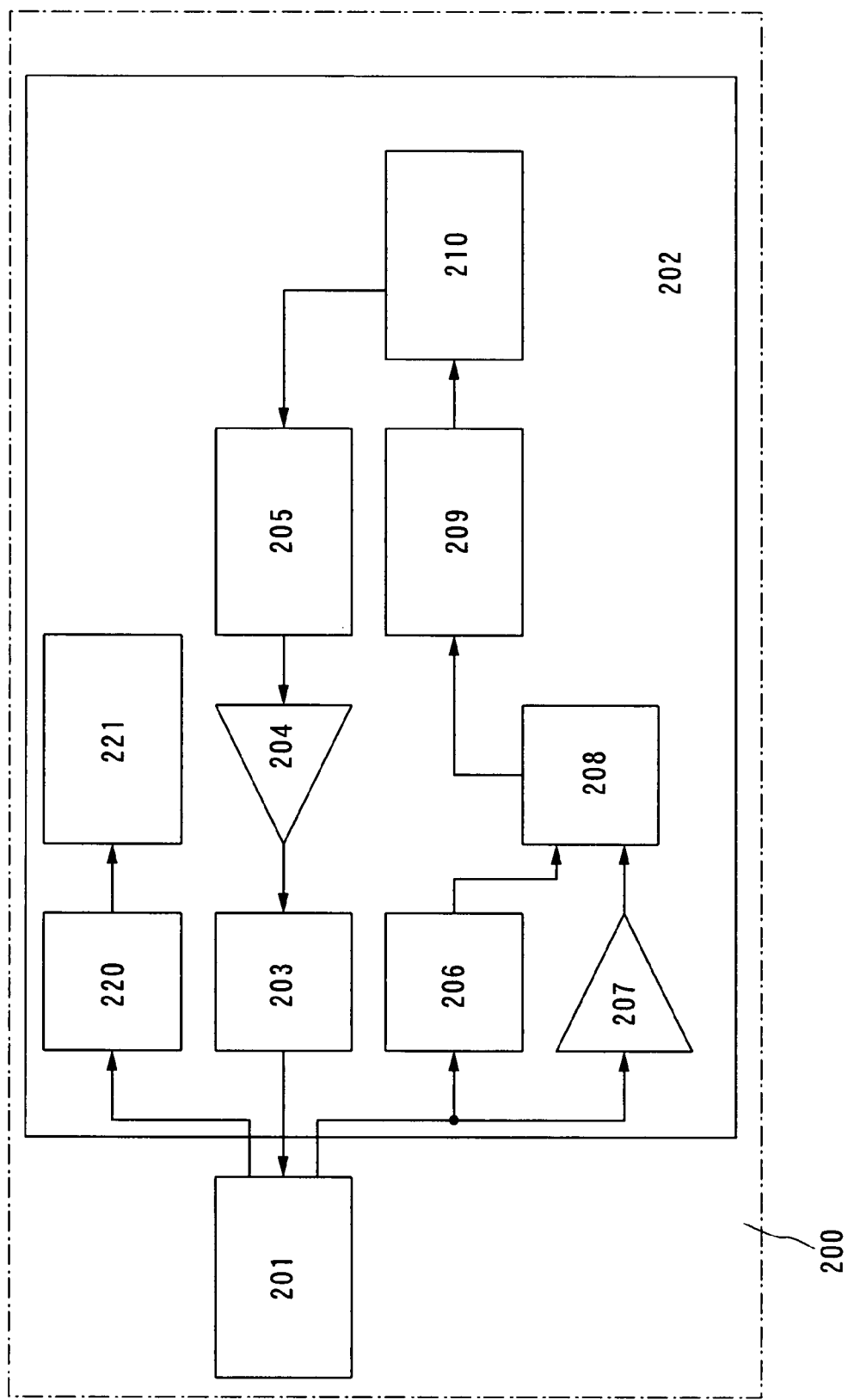
FIG. 20 is a block diagram illustrating a structure of conventional passive RFID.
Figure 21:
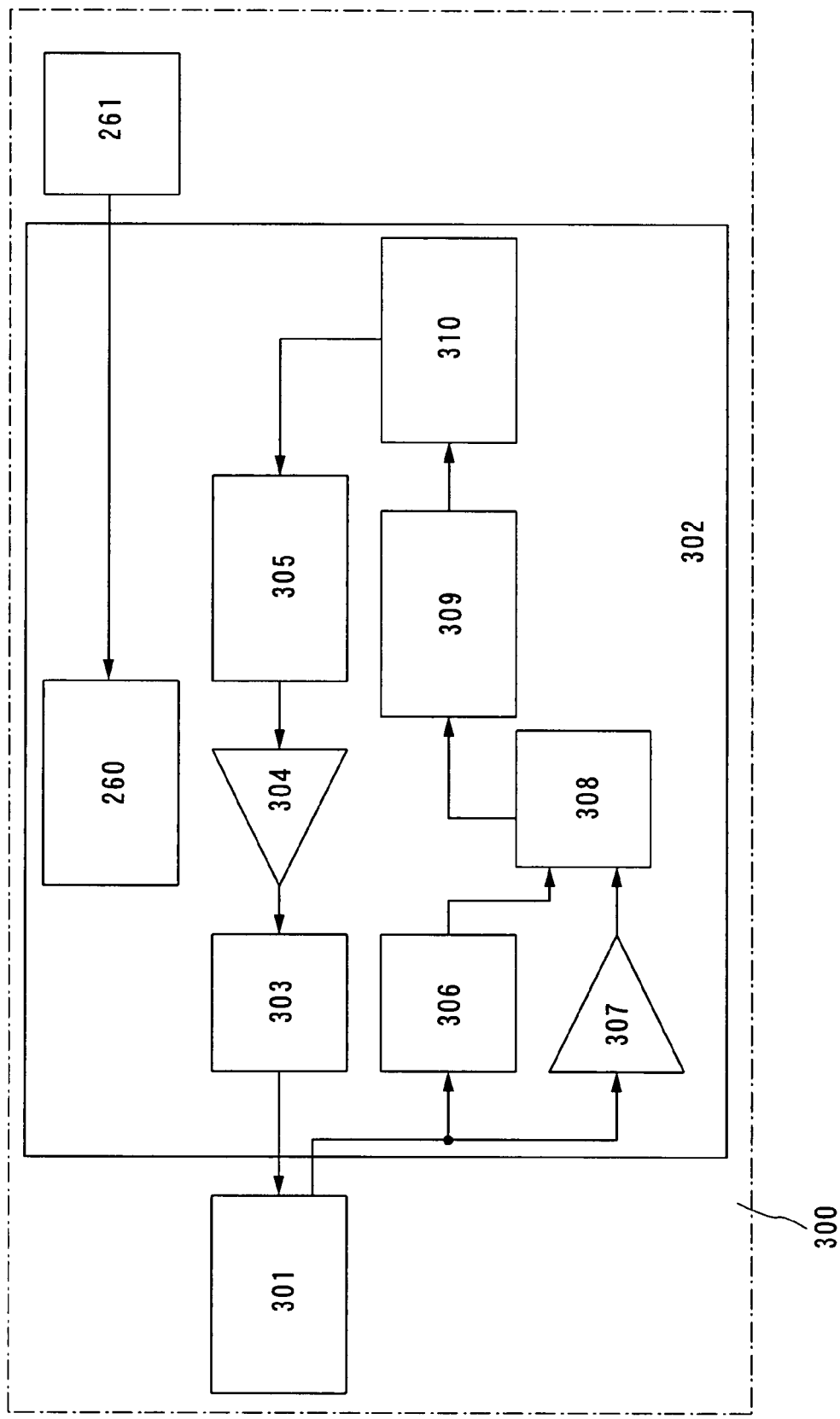
FIG. 21 is a block diagram illustrating a structure of conventional active RFID.

Next, with reference to FIG. 19, a case of luggage inspection at an airport will be described. A piece of luggage 3001 is provided with an ID tag 3011, moved along on a conveyor belt 3007, and made to pass by a reader/writer 3002, whereby, by a signal 3004 transmitted by an antenna 3003, the ID tag 3011 is activated and information contained in memory is converted to a signal and sent back to the reader/writer 3002, and information can be recognized by a computer 3005.

Furthermore, the computer 3005 is connected to a database 3006 in which is stored information about products legitimately (legally) distributed in the marketplace (hereinafter referred to as authentic products) to which an ID label or ID tag is attached or in which a chip is embedded, and information about objects contained in the luggage 3001 can be checked with information in the database 3006. So, if objects other than authentic products are contained in the luggage 3001, an examination is performed, and, if necessary, the object or objects are seized, destroyed, disposed of, or so on. It is to be noted that even if the product or products are authentic, if hazardous materials or guns and swords that are prohibited from being carried onto a plane are included in luggage, these objects are detected by a computer, and in this case, software installed on the computer may be programmed so that luggage containing these kinds of objects cannot be passed through the gate.

Of course, when objects such as non-authentic counterfeit goods, imitation goods, contraband, smuggled goods, and the like obtained from illegal activities are contained in luggage, the luggage cannot be passed through the gate. Herewith, the inflow of counterfeit products into a country or outflow of counterfeit products out of a country can be prevented at the border. Furthermore, because hazardous materials and guns and swords can be detected, this will lead to the prevention of violent crimes and terrorist acts, as well.

This application is based on Japanese Patent Application serial No. 2006-236928 filed in Japan Patent Office on Aug. 31, 2006, the entire contents of which are hereby incorporated by reference.

What is claimed is:

1. A semiconductor device comprising:
a signal processing circuit;
a first antenna and a second antenna which are electrically connected to the signal processing circuit,
wherein the first antenna and the second antenna are electrically connected to a common antenna terminal and the signal processing circuit is electrically connected to the antenna terminal; and
a storage device for supplying electric power to the signal processing circuit,
wherein the first antenna is configured to receive a signal by an electromagnetic induction method or an electromagnetic coupling method using a coil-shaped conductor;
wherein the second antenna is configured to receive a signal by a microwave method using a conductor formed of a right triangle conductor and a first linear conductor, which are connected to each other, and a second linear conductor that is connected to said common antenna terminal;
wherein the signal processing circuit is configured to receive and transmit information via the first antenna,
wherein the signal processing circuit is configured to receive and transmit information via the second antenna; and
wherein the signal processing circuit is configured to generate a direct current voltage from the signals received by the first antenna and the second antenna and the storage device is charged up by the direct current voltage.

2. A semiconductor device comprising:
a signal processing circuit comprising a power section and a logic section;
a first antenna and a second antenna which are electrically connected to the power section and the logic section,
wherein the first antenna and the second antenna are electrically connected to a common antenna terminal and the signal processing circuit is electrically connected to the antenna terminal;
a storage device for supplying electric power to the signal processing circuit,
wherein the logic section is configured to receive and transmit information via the first antenna,
wherein the logic section is configured to receive and transmit information via the second antenna; and
wherein the power section is configured to generate a direct current voltage from signals received by the first antenna and the second antenna and the storage device is charged up by the direct current voltage,
wherein the first antenna is configured to receive a signal by an electromagnetic induction method or an electromagnetic coupling method using a coil-shaped conductor; and
wherein the second antenna is configured to receive a signal by a microwave method using a conductor formed of a right triangle conductor and a first linear conductor, which are connected to each other, and a second linear conductor that is connected to said common antenna terminal.

3. A semiconductor device comprising:
a signal processing circuit comprising a power section and a logic section;
a first antenna and a second antenna which are electrically connected to the power section and the logic section,
wherein the first antenna and the second antenna are electrically connected to a common antenna terminal and the signal processing circuit is electrically connected to the antenna terminal;
a storage device for supplying electric power to the signal processing circuit,
wherein the logic section is configured to receive and transmit information via the first antenna;
wherein the logic section is configured to receive and transmit information via the second antenna;
wherein the power section generates a direct current voltage from signals received by the first antenna and the second antenna and the storage device is charged up by the direct current voltage;
wherein a frequency of a signal received by the first antenna and a frequency of a signal received by the second antenna are different
wherein the first antenna is configured to receive a signal by an electromagnetic induction method or an electromagnetic coupling method using a coil-shaped conductor; and
wherein the second antenna is configured to receive a signal by a microwave method using a conductor formed of a right triangle conductor and a first linear conductor, which are connected to each other, and a second linear conductor that is connected to said common antenna terminal.

4. The semiconductor device according to claim 1, wherein the storage device is a secondary battery.

5. The semiconductor device according to claim 2, wherein the storage device is a secondary battery.

6. The semiconductor device according to claim 3, wherein the storage device is a secondary battery.

7. The semiconductor device according to claim 1, wherein the storage device is a capacitor.

8. The semiconductor device according to claim 2, wherein the storage device is a capacitor.

9. The semiconductor device according to claim 3, wherein the storage device is a capacitor.

* * * * *